United States Patent
Kieselhorst

(12) 
(10) Patent No.: US 10,723,492 B2
(45) Date of Patent: Jul. 28, 2020

(54) DEPOSITOR APPARATUS

(71) Applicant: YAMATO CORPORATION, Mequon, WI (US)

(72) Inventor: Ralph Kieselhorst, Mequon, WI (US)

(73) Assignee: YAMATO CORPORATION, Mequon, WI (US)

( * ) Notice: Subject to any disclaimer, the term of this patent is extended or adjusted under 35 U.S.C. 154(b) by 258 days.

(21) Appl. No.: 15/711,635

(22) Filed: Sep. 21, 2017

(65) Prior Publication Data

US 2019/0084700 A1    Mar. 21, 2019

(51) Int. Cl.
| | | |
|---|---|---|
| B65B 1/32 | (2006.01) | |
| B65B 39/00 | (2006.01) | |
| B65B 39/12 | (2006.01) | |
| G01G 13/00 | (2006.01) | |
| G01G 19/393 | (2006.01) | |

(52) U.S. Cl.
CPC .............. B65B 1/32 (2013.01); B65B 39/007 (2013.01); B65B 39/12 (2013.01); G01G 13/006 (2013.01); G01G 19/393 (2013.01)

(58) Field of Classification Search
CPC ......... B65B 1/32; B65B 39/007; B65B 39/12; G01G 13/006; G01G 13/16; G01G 13/18; G01G 19/393
USPC .......................... 53/235, 246, 539, 245, 248
See application file for complete search history.

(56) References Cited

U.S. PATENT DOCUMENTS

| | | | | | |
|---|---|---|---|---|---|
| 3,783,957 | A | * | 1/1974 | Borghi | B65B 1/32 177/54 |
| 4,538,693 | A | * | 9/1985 | Klopfenstein | G01G 19/393 177/112 |
| 4,676,326 | A | * | 6/1987 | Konishi | G01G 19/393 177/1 |
| 4,753,306 | A | * | 6/1988 | Mosher | G01G 19/393 177/25.19 |
| 4,771,903 | A | * | 9/1988 | Levene | B65B 7/2878 156/69 |
| 4,858,708 | A | * | 8/1989 | Kohno | G01G 13/16 177/25.18 |
| 4,901,807 | A | * | 2/1990 | Muskat | G01G 19/393 177/199 |
| 5,329,749 | A | * | 7/1994 | Yamamoto | A61J 3/074 53/246 |
| 5,335,481 | A | * | 8/1994 | Ward | B01L 9/543 422/933 |
| 5,467,574 | A | * | 11/1995 | Thomsen | A47F 7/0007 53/397 |

(Continued)

FOREIGN PATENT DOCUMENTS

| | | | | | |
|---|---|---|---|---|---|
| EP | | 0099238 A2 | * | 1/1984 | ............. G01G 13/18 |
| EP | | 1571088 A1 | * | 9/2005 | ............. B65B 1/32 |

(Continued)

*Primary Examiner* — Hemant Desai
*Assistant Examiner* — Jacob A Smith
(74) *Attorney, Agent, or Firm* — Norris McLaughlin, P.A.

(57) ABSTRACT

By swinging a collating chute supplied with items, the items are held in a plurality of holding cells formed in a holding array. After all of the holding cells are filled with the items, a diving funnel array is moved downward to a position so as to contact the upper surface of a container. Then, discharge gates of the holding array are opened to discharge the items from the holding cells into a plurality of pockets formed in the container.

12 Claims, 22 Drawing Sheets

(56) References Cited

U.S. PATENT DOCUMENTS

| | | | | |
|---|---|---|---|---|
| 5,588,282 A * | 12/1996 | Hartness | | B65B 21/183 |
| | | | | 53/248 |
| 5,979,512 A * | 11/1999 | McGregor | | B65B 1/32 |
| | | | | 141/10 |
| 6,285,918 B1 * | 9/2001 | Kono | | G01G 19/393 |
| | | | | 53/502 |
| 6,286,717 B1 * | 9/2001 | Schmidhuber | | G01G 13/16 |
| | | | | 141/248 |
| 6,571,532 B1 * | 6/2003 | Wiernicki | | B65B 21/183 |
| | | | | 414/225.01 |
| 6,681,550 B1 * | 1/2004 | Aylward | | B65B 5/103 |
| | | | | 53/244 |
| 7,637,079 B2 * | 12/2009 | Klingel | | B65B 5/103 |
| | | | | 53/55 |
| 7,661,249 B2 * | 2/2010 | Monti | | B65B 5/105 |
| | | | | 53/238 |
| 8,006,468 B2 * | 8/2011 | Bassani | | B65B 5/103 |
| | | | | 221/1 |
| 8,584,434 B2 * | 11/2013 | Kodama | | B65B 5/103 |
| | | | | 53/235 |
| 8,763,352 B2 * | 7/2014 | Metzger | | B65B 1/36 |
| | | | | 53/469 |
| 8,782,999 B2 * | 7/2014 | Kondo | | G07F 17/0092 |
| | | | | 53/244 |
| 9,533,775 B1 * | 1/2017 | Willden | | B65B 1/32 |
| 9,561,887 B2 * | 2/2017 | Kawata | | B65D 47/06 |
| 2002/0096370 A1 * | 7/2002 | Yonetsu | | G01G 19/393 |
| | | | | 177/25.18 |
| 2002/0157874 A1 * | 10/2002 | Wako | | G01G 19/393 |
| | | | | 177/25.18 |
| 2008/0093129 A1 * | 4/2008 | Higuchi | | G01G 19/393 |
| | | | | 177/1 |
| 2009/0101478 A1 * | 4/2009 | Dale | | G01G 13/026 |
| | | | | 198/617 |
| 2009/0194558 A1 * | 8/2009 | Nakagawa | | B65B 3/26 |
| | | | | 221/282 |
| 2009/0277692 A1 * | 11/2009 | Tatsuoka | | G01G 13/026 |
| | | | | 177/25.18 |
| 2010/0108404 A1 * | 5/2010 | Kieselhorst | | G01G 19/393 |
| | | | | 177/25.18 |
| 2010/0219002 A1 * | 9/2010 | Nakagawa | | B65B 37/18 |
| | | | | 177/59 |
| 2010/0224421 A1 * | 9/2010 | Kawanishi | | G01G 19/393 |
| | | | | 177/25.18 |
| 2011/0036645 A1 * | 2/2011 | Kageyama | | G01G 13/026 |
| | | | | 177/25.18 |
| 2011/0113726 A1 * | 5/2011 | Pagani | | B65B 1/24 |
| | | | | 53/235 |
| 2011/0192491 A1 * | 8/2011 | Luchinger | | G01G 13/02 |
| | | | | 141/5 |
| 2012/0037271 A1 * | 2/2012 | Davidson | | B65B 1/06 |
| | | | | 141/129 |
| 2012/0137636 A1 * | 6/2012 | Ours | | B65B 1/02 |
| | | | | 53/452 |
| 2012/0204514 A1 * | 8/2012 | Miyamoto | | B65B 1/22 |
| | | | | 53/235 |
| 2013/0161355 A1 * | 6/2013 | Kawata | | B65D 47/06 |
| | | | | 222/196 |
| 2013/0161356 A1 * | 6/2013 | Kawata | | B65D 88/66 |
| | | | | 222/203 |
| 2013/0298499 A1 * | 11/2013 | Yamagata | | B65B 39/145 |
| | | | | 53/268 |
| 2014/0053511 A1 * | 2/2014 | Malenke | | B65B 5/068 |
| | | | | 53/473 |
| 2014/0102229 A1 * | 4/2014 | Nagai | | G01G 19/393 |
| | | | | 74/55 |
| 2014/0150376 A1 * | 6/2014 | Milton | | B65B 5/103 |
| | | | | 53/235 |
| 2015/0047295 A1 * | 2/2015 | van de Loecht | | B65B 35/205 |
| | | | | 53/235 |
| 2015/0128534 A1 * | 5/2015 | Bouthiette | | B65B 5/08 |
| | | | | 53/475 |
| 2015/0336687 A1 * | 11/2015 | Biason | | B65B 1/08 |
| | | | | 53/235 |
| 2016/0122060 A1 * | 5/2016 | Sweet | | B65B 39/007 |
| | | | | 53/411 |
| 2016/0161135 A1 * | 6/2016 | Kikuchi | | G01G 19/393 |
| | | | | 177/245 |
| 2016/0370222 A1 * | 12/2016 | Morimoto | | G01G 19/393 |
| 2017/0023399 A1 * | 1/2017 | Morimoto | | G01G 13/024 |
| 2017/0082481 A1 * | 3/2017 | Kageyama | | B65G 27/04 |
| 2017/0197739 A1 * | 7/2017 | Ha | | B65B 1/04 |
| 2017/0211967 A1 * | 7/2017 | Otoshi | | G01G 13/003 |
| 2017/0291727 A1 * | 10/2017 | Vollenkemper | | B65B 43/50 |
| 2018/0354661 A1 * | 12/2018 | Koike | | B65B 57/00 |

FOREIGN PATENT DOCUMENTS

| | | |
|---|---|---|
| JP | 59-6732 U | 1/1984 |
| JP | 01-219620 A | 9/1989 |
| JP | 59-0067321 U | 9/1989 |
| JP | 02-017301 U1 | 5/1990 |

* cited by examiner

DEPOSITOR APPARATUS

TECHNICAL FIELD

This invention relates to a depositor apparatus suitable for use in discharging and feeding items, for example, various kinds of food products including snacks and candies, weighed by a weighing apparatus, for example, a combination weigher, into a plurality of storage cavities of a container that are arranged in a matrix-like arrays in the container.

BACKGROUND ART

The patent documents No. 1 and No. 2 describe examples of such an apparatus that discharges and feeds items, which have been weighed by a weigher, into a container having a plurality of storage cavities formed to hold the items. In the apparatuses described in the patent documents No. 1 and No. 2, the weighed items are successively supplied into and temporarily stored in a respective one of a plurality of timing hoppers each arranged correspondingly to an array of storage cavities until all of the timing hoppers are supplied with the items. Then, all of the item-filled timing hoppers are opened to simultaneously drop the items into all of storage cavities arranged in arrays.

The patent document No. 3 describes a similar apparatus using a feeding chute and a tray having a plurality of cavities arranged in arrays to hold the items. In this apparatus, the feeding chute supplied with the weight items is moved in a direction in which the cavities are arranged, and the items are discharged through edge nozzles of the feeding chute into the cavities.

PRIOR ART DOCUMENT

Patent Document

Patent Document No. 1: Japanese Unexamined Utility Model Application Laid-Open Publication No. 1984-6732
Patent Document No. 2: Japanese Examined Utility Model Application Publication No. 1990-17301
Patent Document No. 3: Japanese Unexamined Patent Application Laid-Open Publication No. 1989-219620

SUMMARY OF THE INVENTION

Problems to be Solved by the Invention

Conventionally, when the items are discharged into a plurality of storage cavities of a container, the items per se and/or fragments of the items may scatter, dropping on or attaching to the upper surface of the container, or may accidentally fall into any untargeted storage cavities adjacent to originally targeted ones.

After the storage cavities are filled with the items, the whole upper surface of the container is sealed with a film sheet. The sheet is bonded to the container's upper surface to seal the storage cavities. In case the contamination with extraneous matter described above occurs at the time of feeding the items, any part of the upper surface with such fragments of the items left thereon may be poorly sealed.

Besides the sealing failure, in case any untargeted storage cavity nearby accidentally receives the items or their fragments, the weight of contents in the storage cavity altogether may have a weight beyond a predetermined range of weights.

In the apparatuses described in the patent documents No. 1 and No. 2, the items discharged from the timing hoppers are directly dropped into the storage cavities of the container. In the apparatus described in the patent document No. 3, the items discharged through the edge nozzles of the feeding chute are similarly directly dropped into the storage cavities of the container. None of these patent documents, however, addresses the issues associated with items lodged in untargeted cavities and/or their scattering fragments attaching to the container at the time of feeding items.

Therefore, this disclosure, to address the issues of the known art, is directed to providing a depositor apparatus that may successfully avoid the risk of items being lodged in untargeted cavities and their scattering fragments attaching to the container, and resulting possible sealing failure.

Solutions to the Problems

To this end, this disclosure provides a discharging and distributing apparatus characterized as described below.

1) A depositor apparatus disclosed herein is to be located at a position above a container having a plurality of storage cavities formed to contain items and discharges the items into the plurality of storage cavities of the container.

The depositor apparatus includes:
a collating mechanism having a collating chute with a lower end outlet, the collating chute receiving the items supplied from above, guiding the items downward, and discharging the items through the lower end outlet;

a holding mechanism having a holding array with a plurality of holding cells that hold the items supplied through the lower end outlet of the collating chute, the holding mechanism further having a discharge gate that opens and closes lower ports of the plurality of holding cells of the holding array; and a discharging/guiding mechanism having a diving funnel array that guides the items discharged from the plurality of holding cells of the holding array in the holding mechanism into the plurality of storage cavities of the container.

The discharging/guiding mechanism prompts the diving funnel array to reciprocate between an upper position at which the diving funnel array is spaced apart from an upper surface of the container and a lower position at which the diving funnel array contacts the upper surface of the container.

In this disclosure, the "storage cavities" is a recessed portion of the container formed to contain the items. Each of the "storage cavities" per se may be considered an independent container. Then, the "container having a plurality of storage cavities" may be a container consisting of plurality of containers or a container having a plurality of containers connected to one another.

The depositor apparatus disclosed herein swings the collating chute to discharge the items out of the collating chute through its lower end outlet into the holding cells of the holding array. By differentiating the position of the collating chute and repeatedly carrying out this operation, the items are successively dropped into a respective one of the holding cells in the holding array. When all of the holding cells of the holding array are filled with the items, the discharge gates are opened to discharge the items from all of the holding cells simultaneously. At the time of discharging the items, the diving funnel array is moved downward to contact and cover the upper surface of the container. This may prevent any extraneous matter, such as scattering fragments of the items, from falling on and attaching to the upper surface of the container. The items discharged from the holding cells are guided by the diving funnel array into a respective one of the storage cavities. This may prevent the items from accidentally falling into any untargeted storage cavities adjacent to originally targeted ones.

After all of the storage cavities of the container are filled with the items, the diving funnel array is moved upward away from the container. Then, the item-filled container is conveyed out from a position beneath the diving funnel array, and an empty container is conveyed to and set at the position.

2) In an aspect of this disclosure, a pattern of arrangement of the plurality of storage cavities in the container is a matrix-like pattern, the container containing the items in the plurality of storage cavities is conveyed in any one of a column direction and a row direction of the matrix-like pattern, the plurality of holding cells of the holding array are arranged in correspondence to the matrix-like pattern, the collating mechanism has a plurality of the collating chutes, and the collating mechanism swings all of the plurality of the collating chutes forward and backward in one of the directions in a manner that the lower end outlets follow an arcuate trajectory to distribute the items into a respective one of the plurality of holding cells corresponding to each column or each row of the matrix-like pattern.

According to this aspect, the holding cells of the holding array are arranged in correspondence to the matrix-like pattern of arrangement of the storage cavities in the container. By arcuately swinging the collating chutes along the column or row direction of the matrix-like pattern, the items may be efficiently distributed into a plurality of holding cells corresponding to a plurality of columns or rows of the matrix-like pattern.

After all of the holding cells corresponding to the plurality of columns or rows are supplied with the items from the collating chutes, the discharge gates are opened to discharge the items from all of the holding cells corresponding to the plurality of columns or rows into the plural storage cavities of the container simultaneously.

The container containing the items in the storage cavities arranged in the plurality of columns or rows is conveyed by a distance corresponding to the plurality of columns or rows, and an empty container to be filled with the items next is conveyed into the apparatus.

During that time, the items continue to be supplied to and held in the holding array to prepare to feed the next container with the items.

3) In another aspect of this disclosure, the diving funnel array has guiding passages independent from each other that guide the items discharged from the plurality of holding cells of the holding array into the plurality of storage cavities of the container, and when the diving funnel array of the discharging/guiding mechanism is at the lower position after the plurality of holding cells of the holding array are supplied with the items, the holding mechanism opens the discharge gates to discharge the items simultaneously from the plurality of holding cells of the holding array.

According to this aspect, when the diving funnel array of the discharging/guiding mechanism is at the lower position after the plurality of holding cells of the holding array are supplied with the items, the holding mechanism opens the discharge gates to discharge the items from all of the holding cells of the holding array simultaneously. Thus, the diving funnel array has been moved downward to contact and cover the upper surface of the container at the timing of discharging the items simultaneously. This may prevent extraneous matter, such as scattering fragments of the items, from dropping on and attaching to the upper surface of the container. Additionally, the independent guiding passages of the diving funnel array guide the items discharged from the holding cells into the storage cavities of the container. This may effectively prevent fragments of the items from falling into any untargeted storage cavities adjacent to originally targeted ones.

4) In yet another aspect of this disclosure, the matrix-like pattern of arrangement has m-columns and n-rows (where m and n are natural numbers greater than or equal to 2), the container is conveyed by a distance corresponding to the m-columns or the n-rows, the collating mechanism has m number of or n number of the collating chutes, the collating mechanism swings the m number of or the n number of the collating chutes to m number of or n number of positions along the arcuate trajectory to distribute the items into the plurality of holding cells, and the plurality of holding cells in the holding array of the holding mechanism are m×n number of holding cells. Further, when the diving funnel array of the discharging/guiding mechanism is at the lower position after all of the plurality of holding cells in the holding array are filled with the items, the holding mechanism opens the discharge gates to discharge the items from all of the m×n number of holding cells of the holding array simultaneously, and the diving funnel array of the discharging/guiding mechanism at the lower position guides the items discharged from all of the holding cells of the holding array into the plurality of storage cavities arranged in the matrix-like pattern with the m-columns and n-rows.

According to this aspect, the collating mechanism swings the m number of or the n number of collating chutes to the m number of or the n number of positions along the arcuate trajectory so as to sort the items into the m×n number of holding cells of the holding array. Upon completion of feeding the m×n number of holding cells with the items, the discharge gates are opened to discharge the items simultaneously into the storage cavities arranged in the m×n matrix-like pattern.

The container containing the items in the storage cavities arranged in the m×n matrix-like pattern is conveyed out by a distance corresponding to the m-columns or the n-rows, and an empty container to be filled with the items next is conveyed into the apparatus.

5) In yet another aspect of this disclosure, a combination weigher is positioned above the depositor apparatus, the combination weigher having m number of or n number of collecting hoppers from which the items weighed are discharged, and the items weighed and discharged from the m number of or the number of collecting hoppers are dropped into the m number of or the n number of the collating chutes of the collating mechanism.

In this aspect, the weighed items may be discharged simultaneously from the m number of or the n number of collecting hoppers into the m number of or the n number of collating chutes, and then from the collating chutes into the storage cavities arranged in the matrix-like pattern. Thus, the storage cavities may be efficiently and speedily filled with the items.

6) In yet another aspect of this disclosure, the holding array of the holding mechanism has an upper end surface shaped along the arcuate trajectory of the lower end outlets of the plurality of the collating chutes.

In the collating chutes, their lower end outlets change in height during the swinging motion. In this aspect, however, a relatively small gap may be kept between the lower end outlets of the collating chutes and the holding array at whichever of positions the collating chutes are located in the direction of swing. This may prevent the items from leaking out through between the lower end outlets and the holding array.

7) In yet another aspect of this disclosure, the collating mechanism has a pivotable frame supported in a manner that is pivotable forward and backward by side support structures on both sides of the depositor apparatus, and the plurality of the collating chute are removably mounted to the pivotable frame.

In this aspect, separately, the collating chutes are relatively light in weight and may be readily removed for cleaning and then remounted to the pivotable frame. This may facilitate the removal of the collating chutes as compared to the collating chutes integral with the pivotable frame.

8) In yet another aspect of this disclosure, the guiding passages of the diving funnel array in the discharging/guiding mechanism are a plurality of first through holes that are vertically formed, and the discharging/guiding mechanism has a fixed position transfer funnel between the holding array and the diving funnel array, and the fixed position transfer funnel guides the items discharged from the holding array into the diving funnel array. Further, the fixed position transfer funnel has a plurality of second through holes that are vertically formed, and also has cylinders positioned in correspondence to the plurality of second through holes, the cylinders extending downward and insertable into the plurality of first through holes of the diving funnel array.

In this aspect, the cylinders of the fixed position transfer funnel may be formed in a length large enough for lower ends of the cylinders to extend into the first through holes to some extent. Then, the diving funnel array is moved downward toward the upper surface of the container at the time of filling the container with the items, and the items may be guided into the storage cavities of the container with no gap between the second through holes of the fixed position transfer funnel and the first through holes of the diving funnel array. This may prevent the items from leaking out through between the fixed position transfer funnel and the diving funnel array at the time of filling the container with the items.

9) In yet another aspect of this disclosure, the fixed position transfer funnel is detachably supported by support brackets fixed to the side support structures on both sides of the depositor apparatus.

In this aspect, when, for example, the fixed position transfer funnel is to be cleaned, the fixed position transfer funnel alone may be readily removed from the support brackets and then remounted to the support brackets when the cleaning is over.

10) In yet another aspect of this disclosure, the discharging/guiding mechanism has vertical slide brackets allowed to move upward and downward, the vertical slide brackets being positioned in lower parts of the side support structures on both sides of the depositor apparatus, and the diving funnel array is removably mounted to the vertical slide brackets.

In this aspect, when, for example, the diving funnel array is to be cleaned, the diving funnel array alone may be readily removed from the vertical slide brackets and then remounted to the vertical slide brackets when the cleaning is over.

11) In yet another aspect of this disclosure, the holding mechanism has support frames that support the holding array and the discharge gates, and the support frames are movable along guide rails positioned in the side support structures on both sides of the depositor apparatus.

In this aspect, the support frames supporting the holding array and the discharge gates may be readily removed from the side support structures at the time of maintenance and inspection.

Effects of the Invention

As described thus far, the depositor apparatus disclosed herein, when discharging the items into the storage cavities of the container arranged in the matrix-like pattern, may effectively prevent extraneous matter, such as fragments of the items, from attaching to the upper surface of the container and/or falling into any untargeted storage cavities in adjacency to originally targeted ones.

EMBODIMENTS OF THE INVENTION

First Embodiment

A weighing and feeding system equipped with a depositor apparatus according to a non-limiting embodiment of this disclosure is hereinafter described referring to the accompanying drawings.

Figure 1:
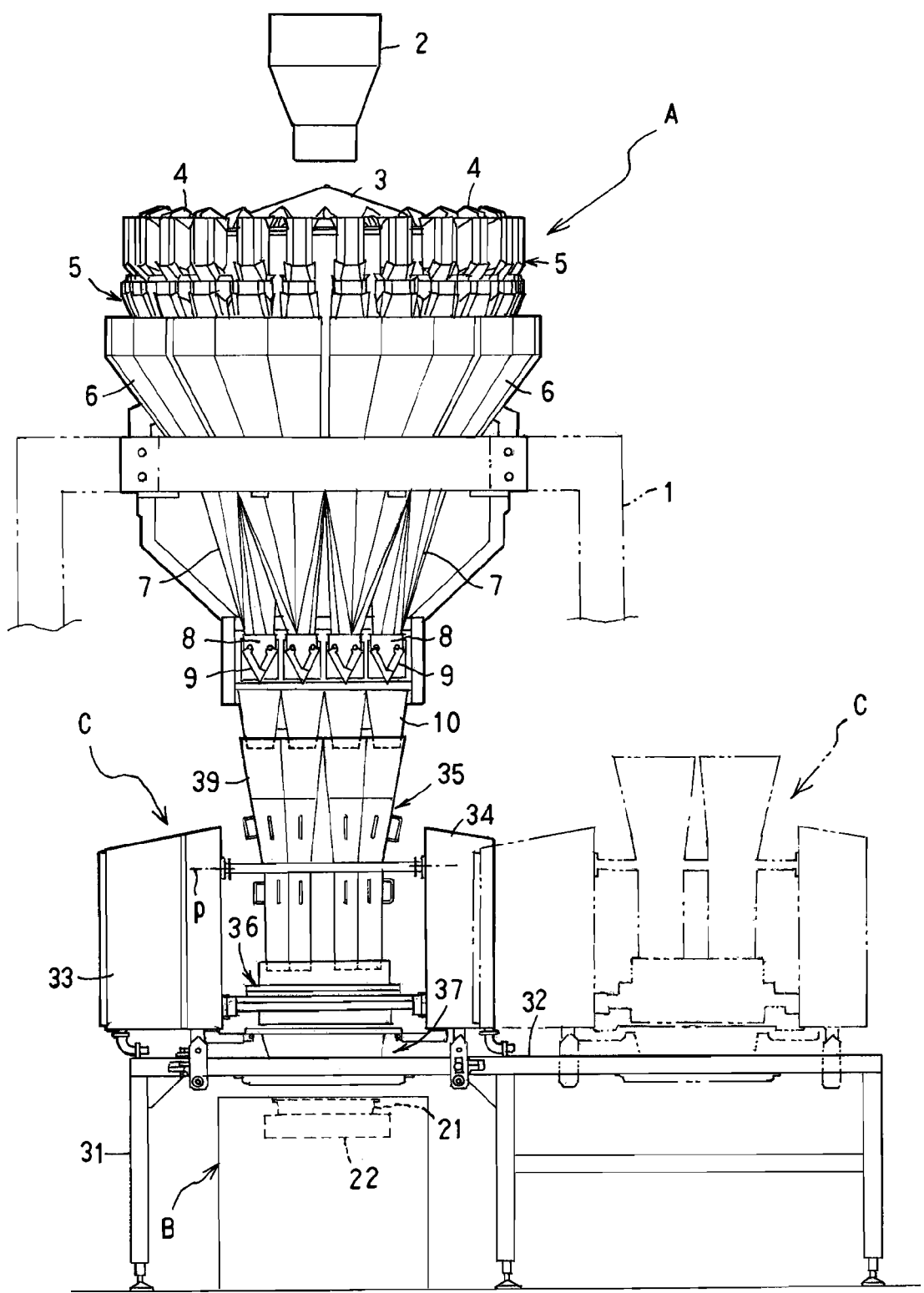
FIG. 1 is a front view of a weighing and feeding system equipped with a depositor apparatus according to an embodiment of this disclosure.
Figure 2:
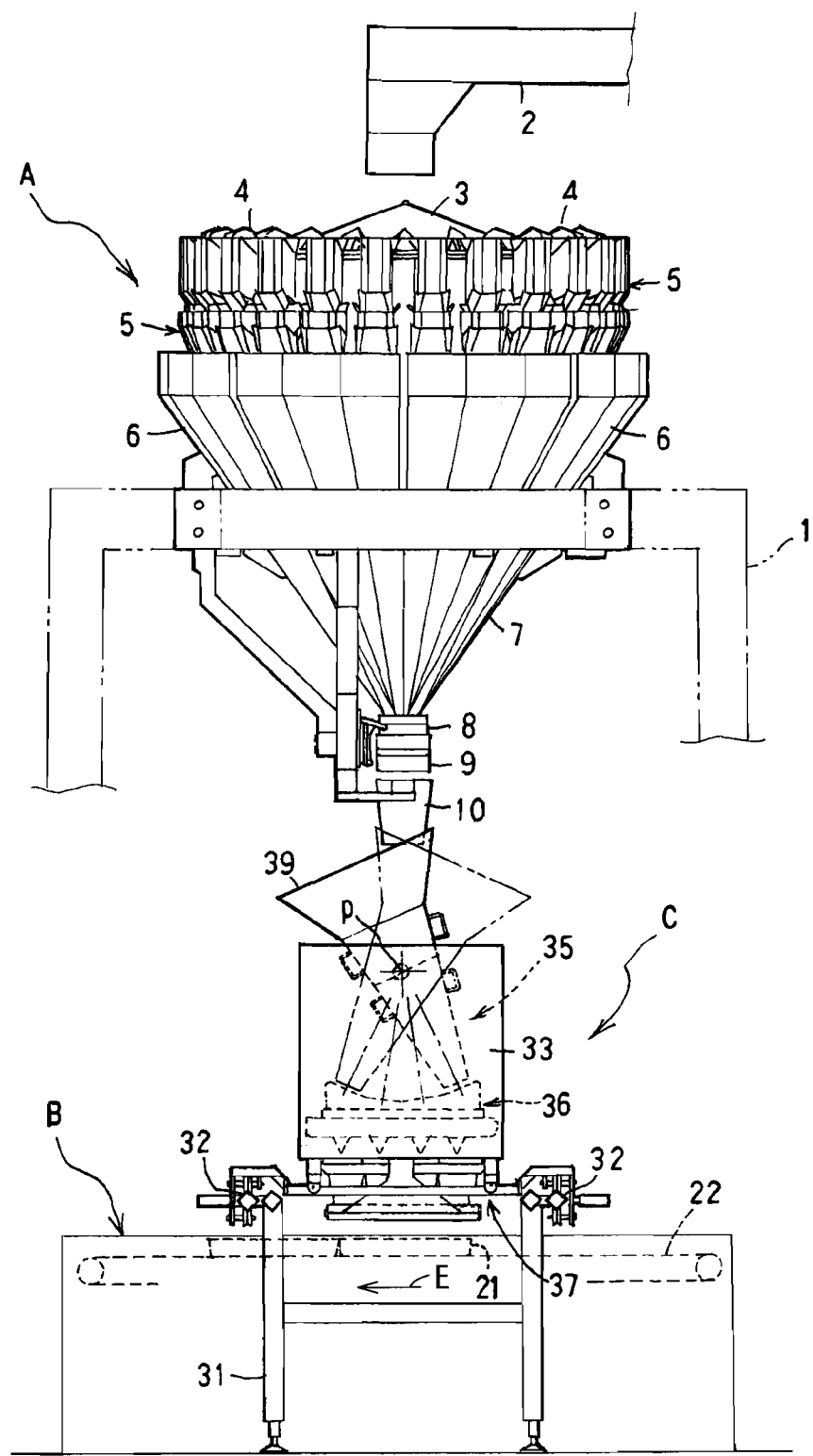
FIG. 2 is a side view of the weighing and feeding system.
Figure 3:
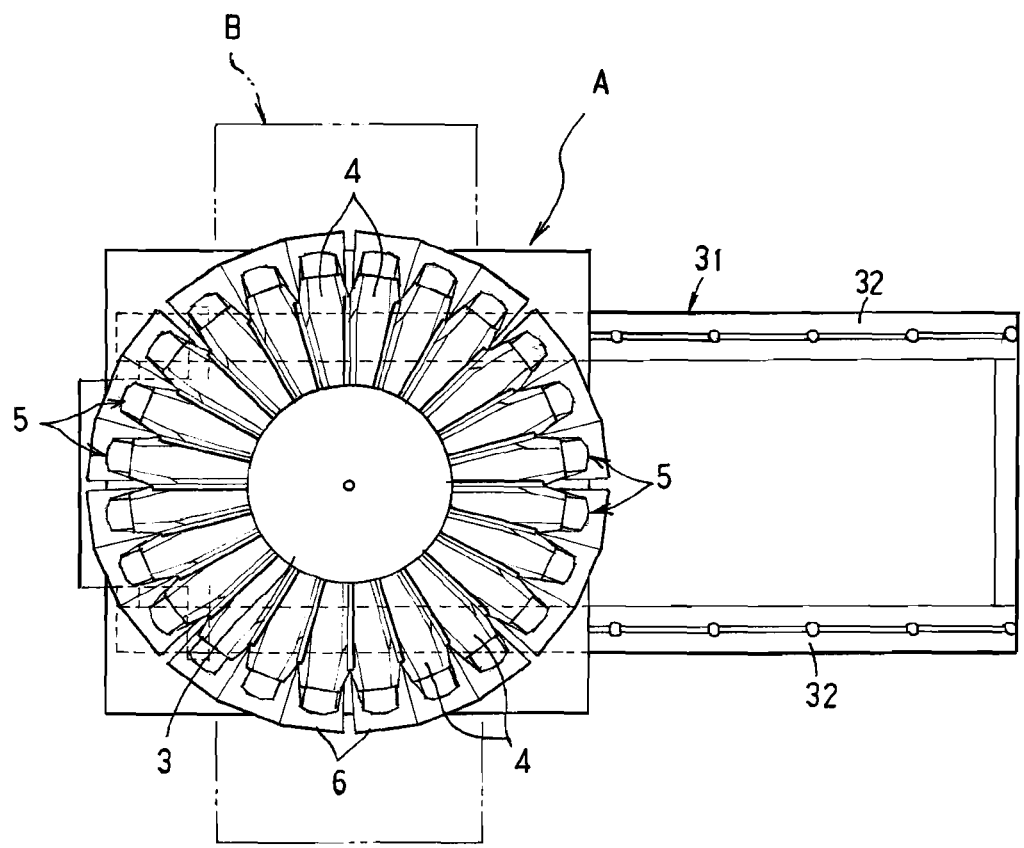
FIG. 3 is a plan view of the weighing and feeding system.

FIG. 1 is a front view of the weighing and feeding system. FIG. 2 is a side view of the weighing and feeding system. FIG. 3 is a plan view of the weighing and feeding system. The weighing and feeding system according to this embodiment is configured to weigh a predetermined small quantity of items such as various kinds of food products including snacks and candies, and discharge and feed the weighed items into a plurality of pockets; storage cavities, formed in a container to hold the items. This weighing and feeding system includes a combination weigher A that weighs a predetermined quantity of items, a container convey apparatus B, and a depositor apparatus C. The container convey apparatus B is prompted by a packaging machine, not illustrated in the drawings, to horizontally convey the container. The depositor apparatus C discharges and feeds the items weighed by the combination weigher A into the container's pockets. For simplicity of description on the structural features of this system, a transverse direction in FIG. 1 and a direction from the front to back side of FIG. 2 facing this drawing are referred to as "lateral direction (or right, left)", and a direction from the front to back side of FIG. 2 facing this drawing and a transverse direction in FIG. 2 are referred to as "front-back direction".

The combination weigher A is located with a support frame 1 and set at an appropriate distance above the floor surface. In the combination weigher A according to this embodiment, the items conveyed by a feeding conveyer 2 are dropped at the top center position of the weigher, and then vibrated and dispersed in all directions by a conically-shaped dispersing feeder 3. Then, the items are further vibrated and dispersed more outward by multiple linear feeders 4 radially positioned around the dispersing feeder 3 into weighing units 5 positioned at lower ends of the linear feeders 4. The weights of the items measured by the weighing units 5 are computed based on a combinatorial logic to obtain the items of a predetermined weight. Then, the items of a predetermined weight are, by way of collecting chutes 6 and collecting funnels 7, collected and temporarily stored in collecting hoppers 8. Then, collecting gates 9 at the bottom of the collecting hoppers 8 are opened to drop the items of a predetermined weight temporarily stored in the collecting hoppers 8, by way of guide funnels 10, into the depositor apparatus C down below.

Though not illustrated in detail in the drawings, the weighing units 5 are structured similarly to the known art, in which the items from the linear feeders 4 are received by and temporarily stored in feeding hoppers, and the items discharged from the feeding hoppers are received by and temporarily stored in weighing hoppers to weigh the received items.

The multiple weighing units 5 arranged annularly at the lower outer edges of the linear feeders 4 are circumferentially divided into a plurality of groups. The collecting hoppers 8 are each arranged correspondingly to a respective one of the groups of weighing units 5. In the illustrated example, there are altogether 24 weighing units 5, which are divided into four groups each consisting of 6 weighing units 5. Each one of the groups executes the combinatorial logic-based computation using the six weighing units 5, and the weighed items having a predetermined weight are dropped into the collecting hoppers 8 each allocated to a respective one of the groups. Briefly describing the whole operation, the items at the top center position of the weigher are combined and weighed in routes of four structural units and respectively conveyed into the four collecting hoppers 8, and then dropped in alignment to four positions downward when the collecting gates 9 of the collecting hoppers 8 are opened.

Figure 4:
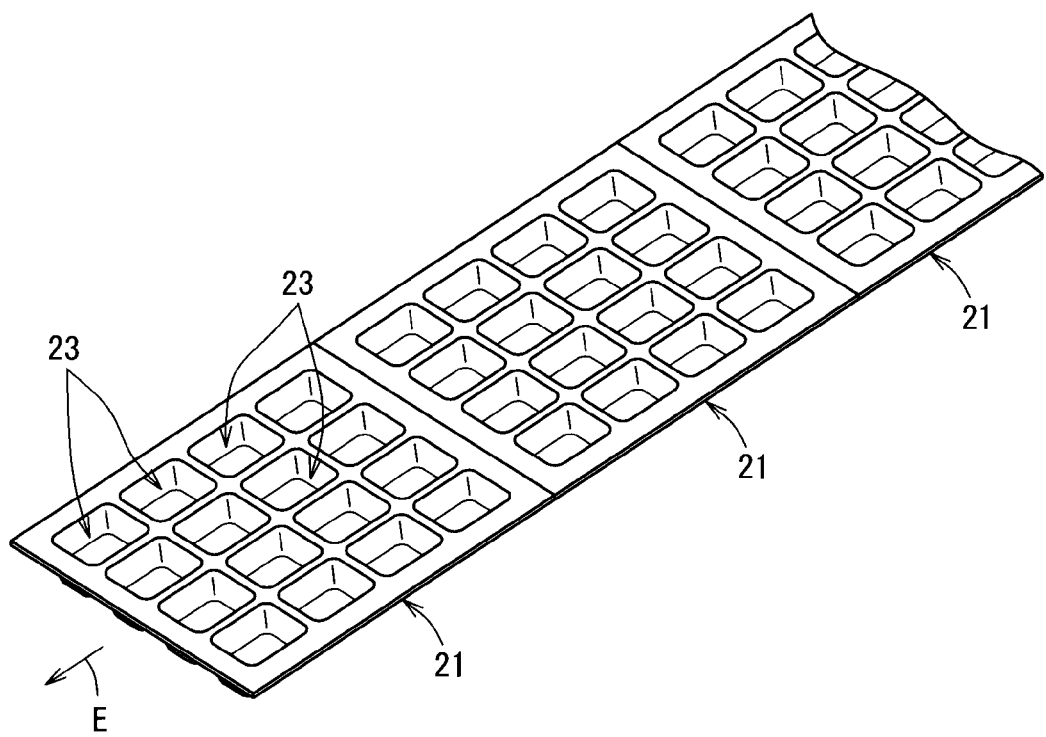
FIG. 4 is a perspective view of a container.

FIG. 4 illustrates resin-made containers 21 each having a group of pockets 23 formed to contain the items. These containers 21 are horizontally placed on the conveyer 22 of the container convey apparatus B and conveyed in sequence forward as indicated with arrow E. In the illustrated example, each container has rectangular pockets 23 arranged in four horizontal and vertical rows, i.e., in a m-columns and n-rows (m=4, n=4) of a matrix-like pattern. The items are divided and contained in 16 (=m×n) pockets 23 of each container 21. The container 21 having all of the 16 pockets 23 filled with the items is conveyed out to a packaging machine not illustrated in the drawings, where a film sheet is bonded to the whole upper surface of the container so that the pockets 23 are each independently sealed.

The depositor apparatus C is mounted on and supported by a base 31 set on the floor surface. On lateral sides of the base 31 are paired rails 32 which are horizontally extending in the front-back direction. The depositor apparatus C is mounted on the rails 32 and allowed to slidably move on these rails in the front-back direction. The depositor apparatus C is fixable at two positions; a work position immediately below the combination weigher A, and a maintenance position laterally remote from the work position immediately below the combination weigher A as illustrated with virtual lines in FIG. 1.

The depositor apparatus C has side support structures 33 and 34 spaced at a predetermined interval on opposite sides of the apparatus in the lateral direction. A collating mechanism 35, a holding mechanism 36, and a discharging/guiding mechanism 37 are mounted, from the upper side, between the side support structures 33 and 34 of the depositor apparatus C. These structural elements are hereinafter described in detail.

[Collating Mechanism 35]

Figure 5:
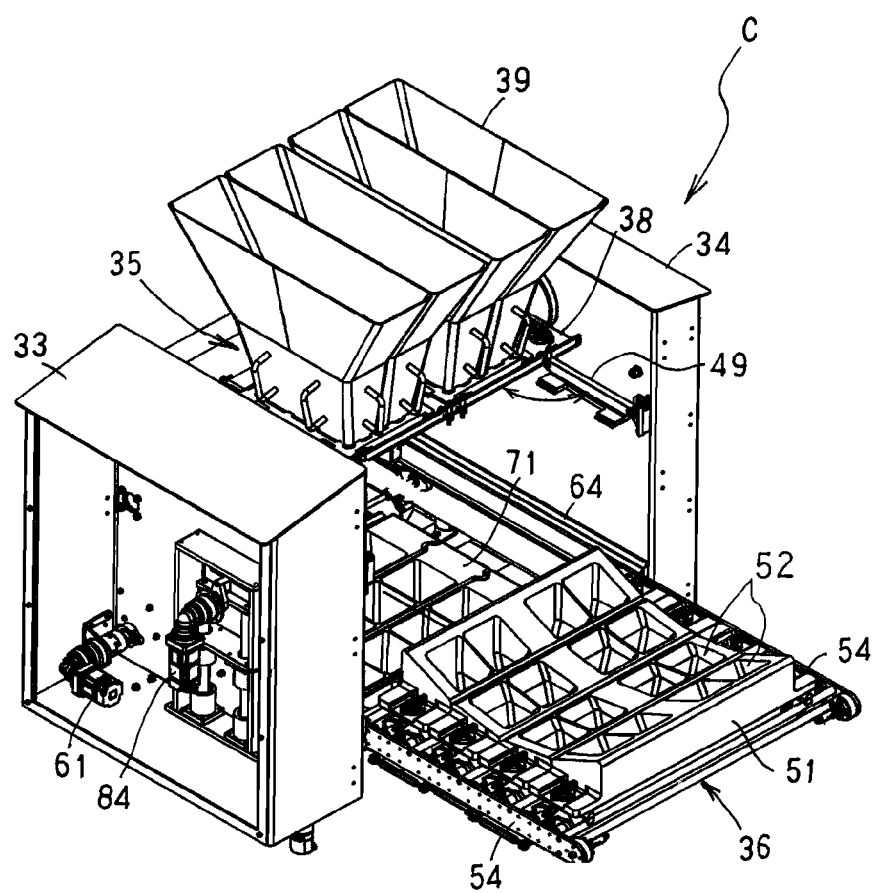
FIG. 5 is a perspective font view of the depositor apparatus.
Figure 6:
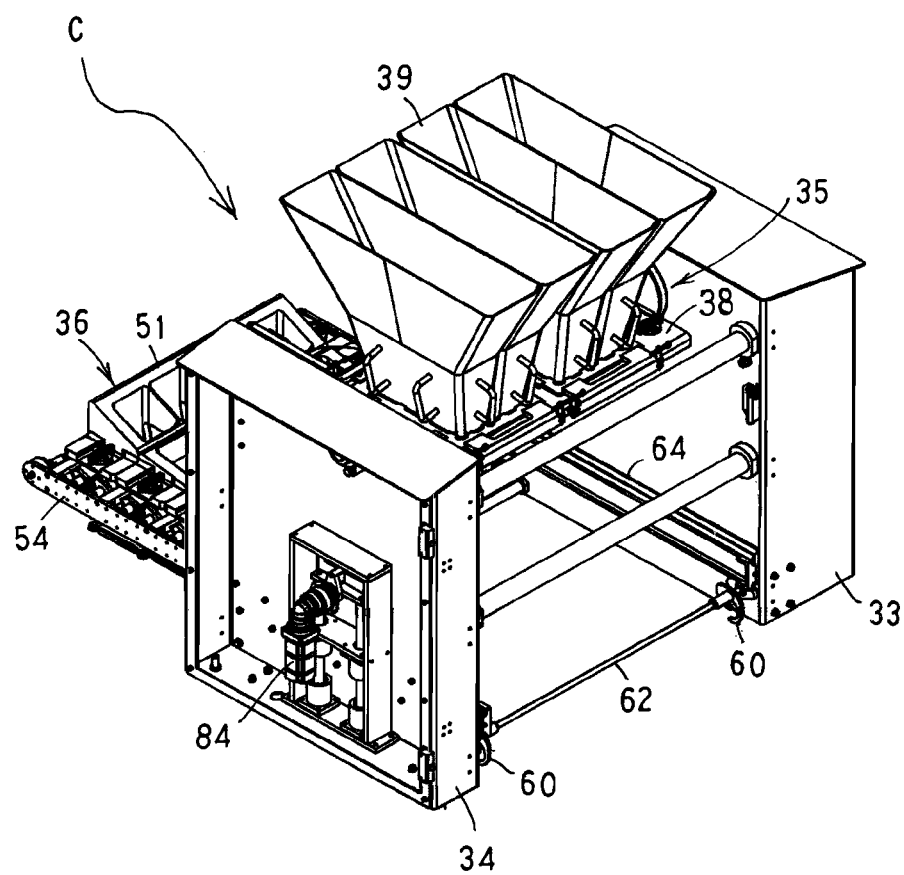
FIG. 6 is a perspective rear view of the depositor apparatus.

The collating mechanism 35 has a pivotable frame 38 supported by the side support structures 33 and 34 in a manner that is pivotable forward and backward through a certain range of angles around an axis p extending horizontally in the lateral direction. Four collating chutes 39 are facing the collecting hoppers 8 of the combination weigher A from below. These collating chutes 39 are mounted in alignment to the pivotable frame 38, as illustrated in FIGS. 5 and 6.

Figure 7:
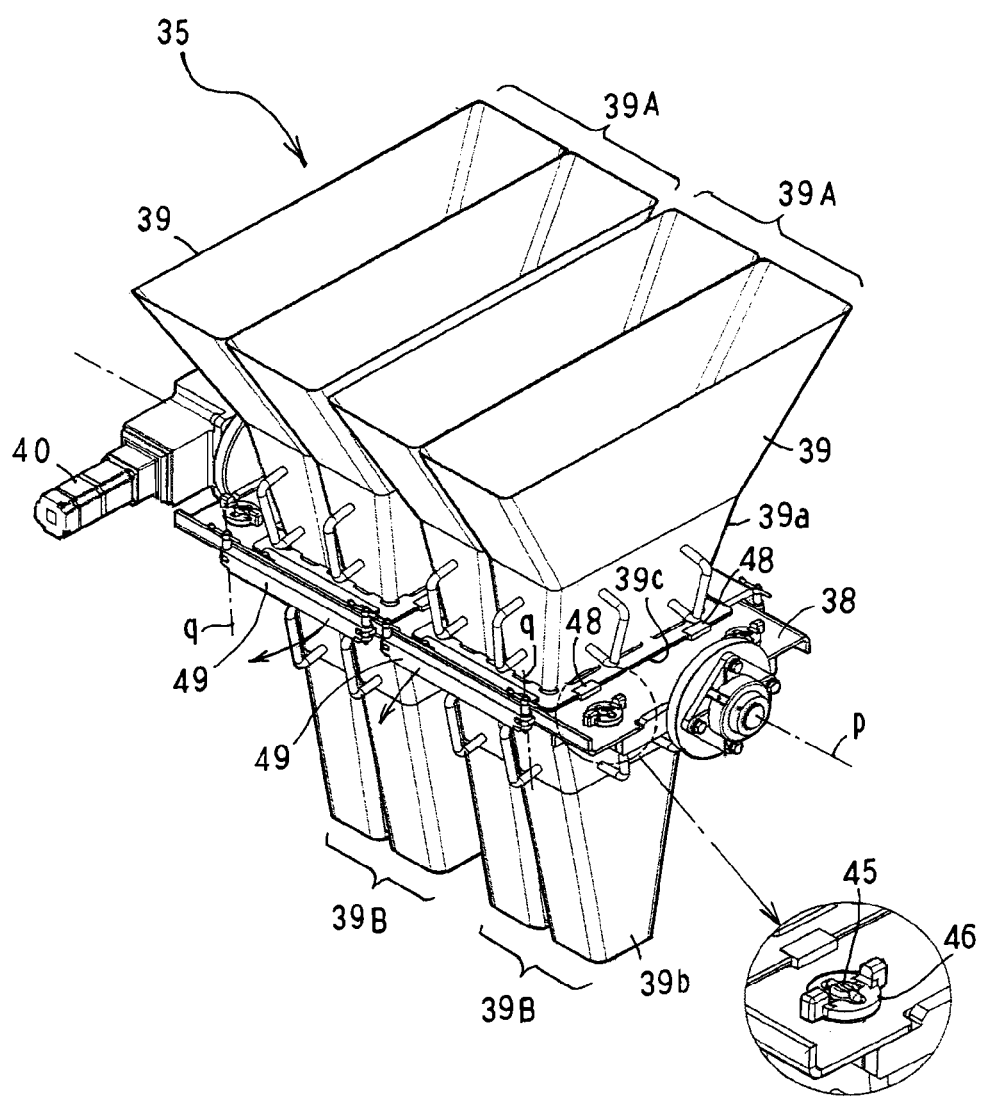
FIG. 7 is a perspective view of a collating mechanism in the depositor apparatus.
Figure 8:
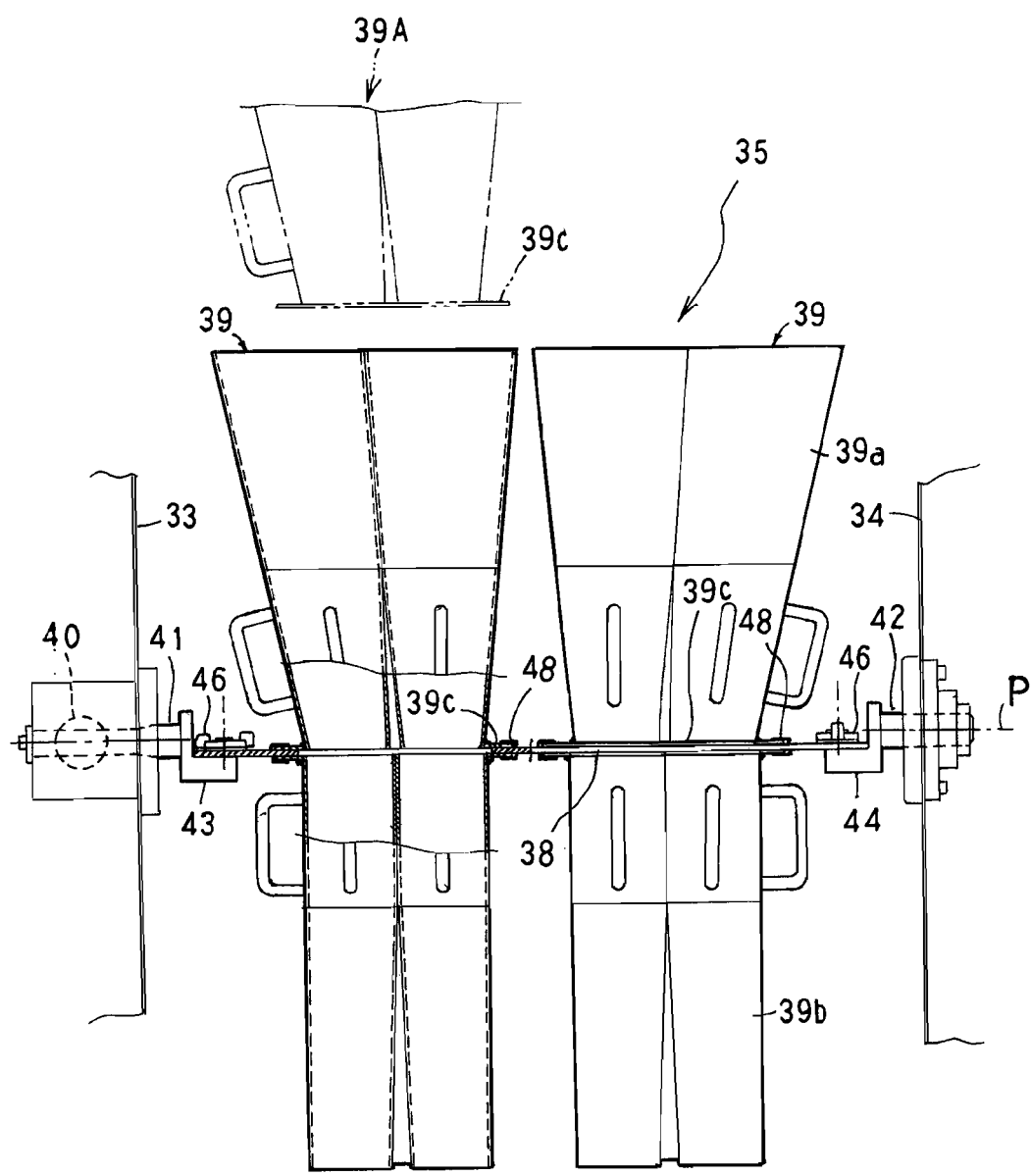
FIG. 8 is a partly cutaway, front view of the collating mechanism.

FIGS. 7 and 8 illustrate a support structure for the pivotable frame 38. A drive shaft 41 rotated forwardly and reversely by a servo motor 40 is rotatably supported by the side support structure 33 on one side (left side on FIG. 8). A free rotating shaft 42 concentric to the axis p is abutting and supported by the side support structure 34 on the other side (right side on FIG. 8). The drive shaft 41 and the free rotating shaft 42 are respectively protruding from the side support structures 33 and 34. The pivotable frame 38 is removably coupled to support brackets 43 and 44 at protruding ends of the respective shafts.

Coupling pins 45 and lock rings 46 are used to couple and decouple the pivotable frame 38 to and from the support brackets 43 and 44. The coupling pins 45 are positioned upright on the support brackets 43 and 44. The lock rings 46 are manually pivoted and thereby coupled to heads of the coupling pins 45. The coupling pins 45 are inserted in the pivotable frame 38 from above, and the lock rings 46 are fitted in a predetermined posture to the exposed heads of the coupling pins 45 and then pivoted through 90 degrees. This allows the pivotable frame 38 to be fixedly fastened to the support brackets 43 and 44 by the action of cam at engaging parts of the pin heads and the lock rings 46.

The collating chutes 39 each have an angular cylindrical shape tapered downward when laterally viewed, with its upper end opening broadened in the front-back direction. Wherever the pivotable frame 38 is located within the range of its pivoting movement, the upper end openings of the collating chutes 39 are facing the outlet of the combination weigher A from directly below, i.e., lower end outlets of the guide funnels 10.

The collating chute 39 consists of two segments; an upper chute 39a mounted to the upper surface of the pivotable frame 38, and a lower chute 39b mounted to the lower surface of the pivotable frame 38. These upper chutes 39a and the lower chutes 39b of the collating chutes 39 are respectively detachably attached to the upper surface and the lower surface of the pivotable frame 38. Two of the upper chutes 39a on the left side, and the other two upper chutes 39a on the right side are integrally combined to form two upper chute blocks 39A. The upper chute blocks 39A have, at their lower ends, flanges 39c that are attachable to the upper surface of the pivotable frame 38. The pivotable frame 38 has, on its upper surface, clamp claws 48 that are engageable with the flanges 39c.

As illustrated in FIG. 7, the pivotable frame 38 has, at its front end, clamp bars 49 that are oscillatable forward and backward around a vertical supporting point q. When the clamp bar 49 is oscillated forward and opened, the upper chute block 39a is pulled forward and removed. When the flanges 39c of the upper chute block 39A are inserted into between the upper surface of the pivotable frame 38 and the clamp claws 48 all the way to the rear end, and the clamp bar 49 is then closed and fixed, the upper chute block 39A is fixed at a predetermined position of the pivotable frame 38 and is thereby not pulled out forward. Likewise, two of the lower chutes 39b on the left side and the other two lower chutes 39b on the right side are respectively integrally combined to form two lower chute blocks 39B, though not illustrated in detail in the drawings. As with the upper chute blocks 39A, these two lower chute blocks 39B of the collating chutes 39 are attachable to and detachable from the lower surface of the pivotable frame 38.

In the collating mechanism 35 thus structurally characterized, when the pivotable frame 38 is pivoted, the lower end outlets of the collating chutes 39 are swingable to four positions; a foremost position remote from the center of a forward and backward swingable range, a front-side position slightly remote from the center, a rear-side position slightly remote from the center, and a rearmost position remote from the center. The collating mechanism 35 is allowed to receive the items discharged from the four collecting hoppers 8 at any of these four positions using corresponding ones of the four collating chutes 39, and to discharge the received items through the lower end outlets to four positions in the front-back direction.

[Holding Mechanism 36]

As illustrated in FIGS. 9 to 13, the holding mechanism 36 has a holding array 51 having a plurality of vertically penetrating holding cells 52, and a plurality of pairs of discharge gates (may be generally termed as "staging door") 53a and 53b that open and close the lower end outlets of the holding cells 52. The holding array 51 includes four mono-block inserts 51a arranged in the front-back direction correspondingly to the four discharge positions of the collating chutes 39 in the front-back direction. Each of the mono-block inserts 51a has four holding cells 52 arranged in the lateral direction correspondingly to the lower end outlets of the four collating chutes 39. The upper end surfaces of the four mono-block inserts 51a arranged in the front-back direction are inclined so as to substantially follow an arcuate trajectory of movement of the lower ends of the collating chutes 39 swingable forward and backward. Then, the gap becomes smaller between the lower ends of the collating chutes 39 and the upper end surface of the holding array 51. This may prevent that the items dropping from the collating chutes 39 leak out through between the lower ends of the collating chutes 39 and the upper end surface of the holding array 51.

The four mono-block inserts 51a of the holding array 51 is mountable to and dismountable from ladder-like support frames 54 from above by a one-touch operation using coupling pins 55 and lock rings 56.

The mono-block inserts 51a, fixed position transfer funnel array 71, and the diving funnel array 72 are constructed of a homogeneous material rather than separate discrete or fabricated pieces to facilitate changing to a different matrix container pattern. This construction method also eliminates crevices and facilitates hygienic design practices.

The mono-block inserts 51a each have a pair of front and back discharge gates 53a and 53b that open and close the lower end outlets of the four holding cells 52 arranged in a row in the lateral direction. The discharge gates 53a and 53b are supported by side plates of the support frames 54 in a manner that are pivotable around left and right supporting points a and b horizontally aligned. The paired discharge gates 53a and 53b are engaged with each other with a reversal linkage 57 in a reversely movable manner. The discharge gates 53a and 53b are thereby allowed to pivot in two postures; an item holding posture in which these gates are in contact in a tapered shape to close the lower end outlets of the holding cells 52, and an item discharge posture in which these gates are spaced apart to open the lower end outlets of the holding cells 52.

Of the four pairs of discharge gates 53a and 53b, the discharge gates 53a located on the same side in the front-back direction are coupled so as to interlock with each other with engaging linkages 58, so that the four pairs of discharge gates 53a and 53b arranged in the front-back direction are allowed to synchronously open and close.

Figure 12:
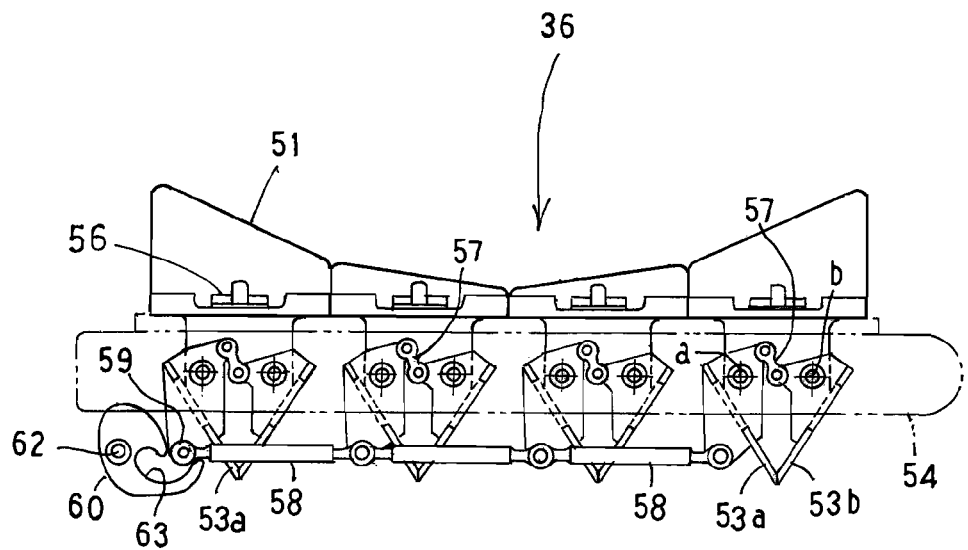
FIG. 12 is a side view of the holding mechanism with discharge gates being closed.
Figure 13:
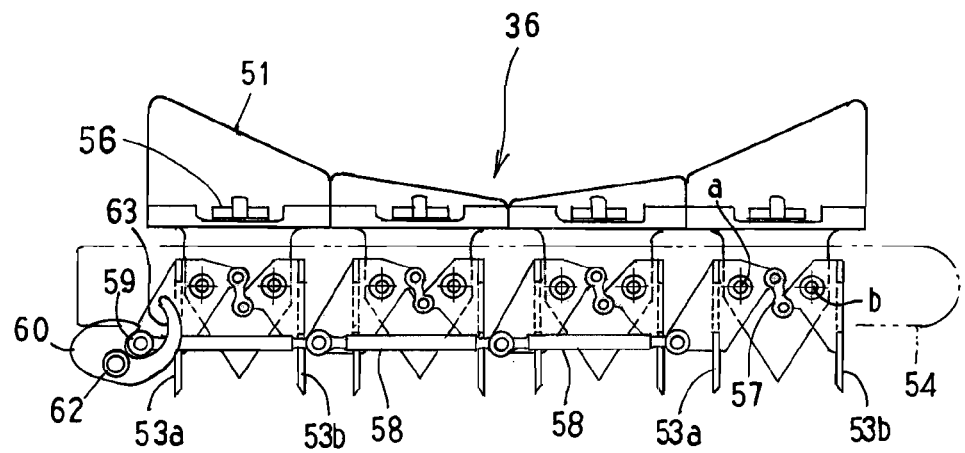
FIG. 13 is a side view of the holding mechanism with the discharge gates being opened.

As illustrated in FIGS. 12 and 13, a drive pin 59 is attached to a pivotal coupling point of the rearmost discharge gate 53a and the engaging linkage 58. All of the discharge gates 53a and 53b are opened and closed by moving the drive pin 59 forward and backward using a drive cam 60.

A drive shaft 62 for gate opening and closing is horizontally supported in the lateral direction by the side support structures 33 and 34. The drive shaft 62 is rotated forwardly and reversely by a servo motor 61. The drive cam 60 is coupled and fixed to the right and left ends of the drive shaft 62 (see FIG. 6).

The drive cam 60 has a spiral cam groove 63 engageable with and disengageable from the drive pin 59. As illustrated in FIG. 12, the discharge gates 53a and 53b are closed when the drive pin 59 is engaged with vicinity of the entrance of the cam groove 63. As illustrated in FIG. 13, the discharge gates 53a and 53b are opened when the drive cam 60 is pivoted upward and the drive pin 59 is guided further into the cam groove 63. This allows the discharge gates 53a and 53b to be opened slightly or fully during operation to facilitate item size and optimize machine speed. The distance by which the discharge gates 53a and 53b are opened is adjustable by manipulating an operation setting display, not illustrated in the drawings, of the depositor apparatus C.

Figure 9:
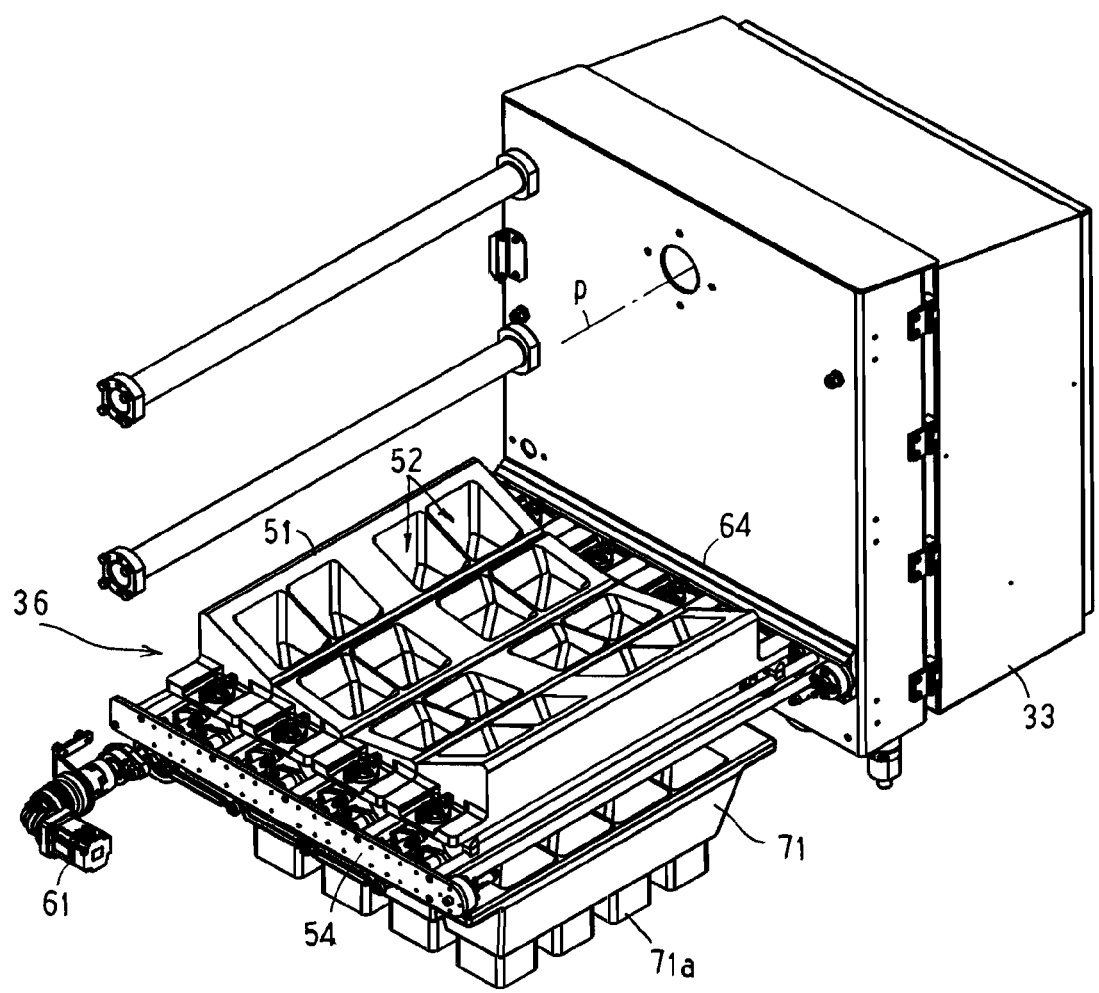
FIG. 9 is a perspective view of a holding mechanism being mounted to the depositor apparatus.
Figure 10:
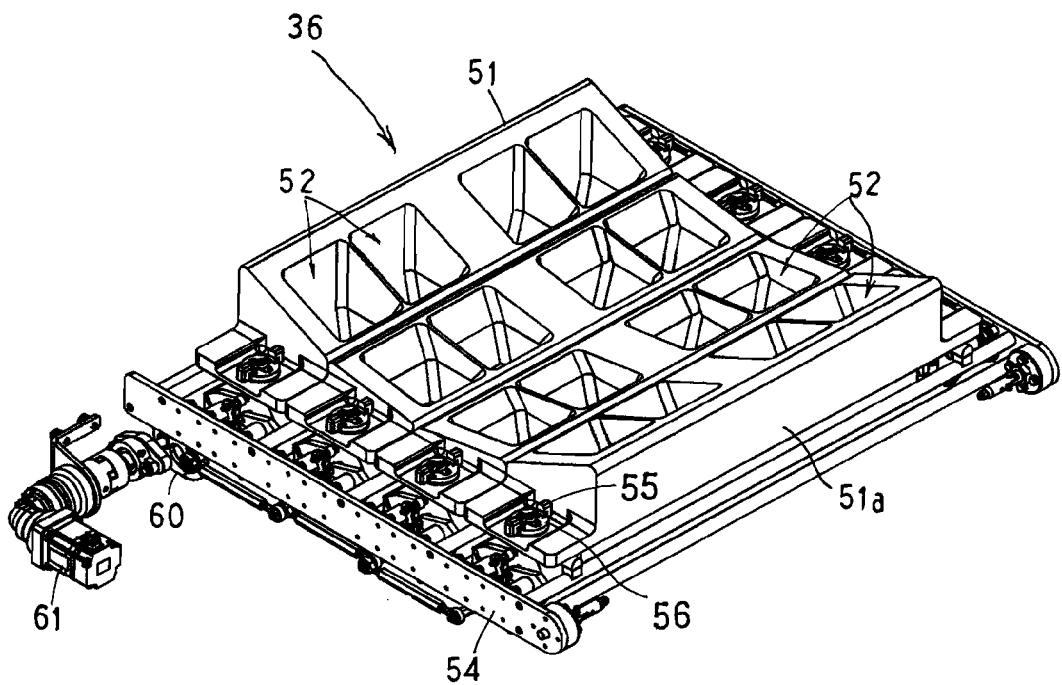
FIG. 10 is a perspective view of the holding mechanism.
Figure 11:
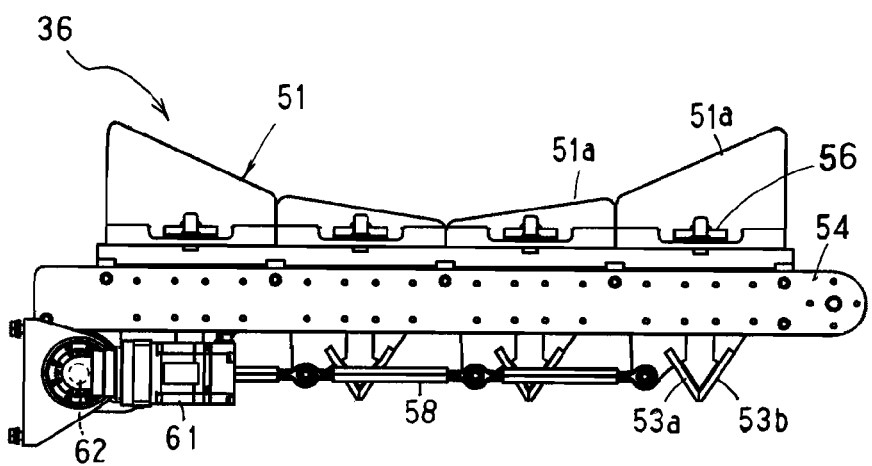
FIG. 11 is a side view of the holding mechanism.

As illustrated in FIGS. 5, 6, and 9, the support frames 54 on the right and left sides of the holding mechanism 36 are fitted and supported in a manner that are movable in the front-back direction along guide rails 64 on side surfaces of the side support structures 33 and 34. The guide rails 64 are horizontally extending in the front-back direction. In the event of maintenance, for example, cleaning, the whole holding mechanism 36 with the discharge gates 53a and 53b being closed may be pulled out forward from between the side support structures 33 and 34.

[Discharging/Guiding Mechanism 37]

The discharging/guiding mechanism 37 has a fixed position transfer funnel 71 horizontally supported by the side support structures 33 and 34, and also has a diving funnel array 72 movable upward and downward beneath the fixed position transfer funnel 71.

Figure 14:
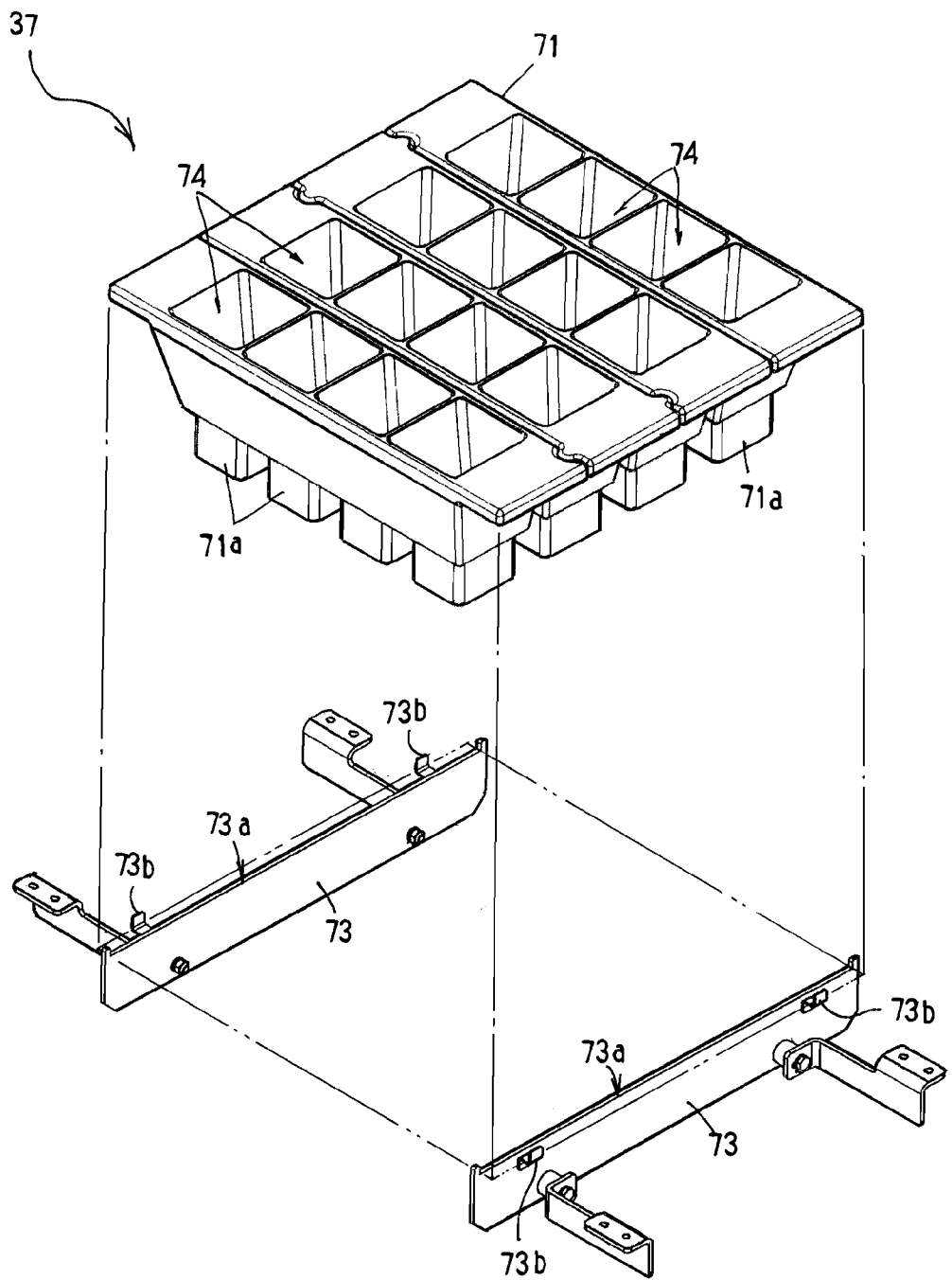
FIG. 14 is an exploded perspective view of a support structure for a fixed position transfer funnel of a discharging/guiding mechanism in the depositor apparatus.
Figure 15:
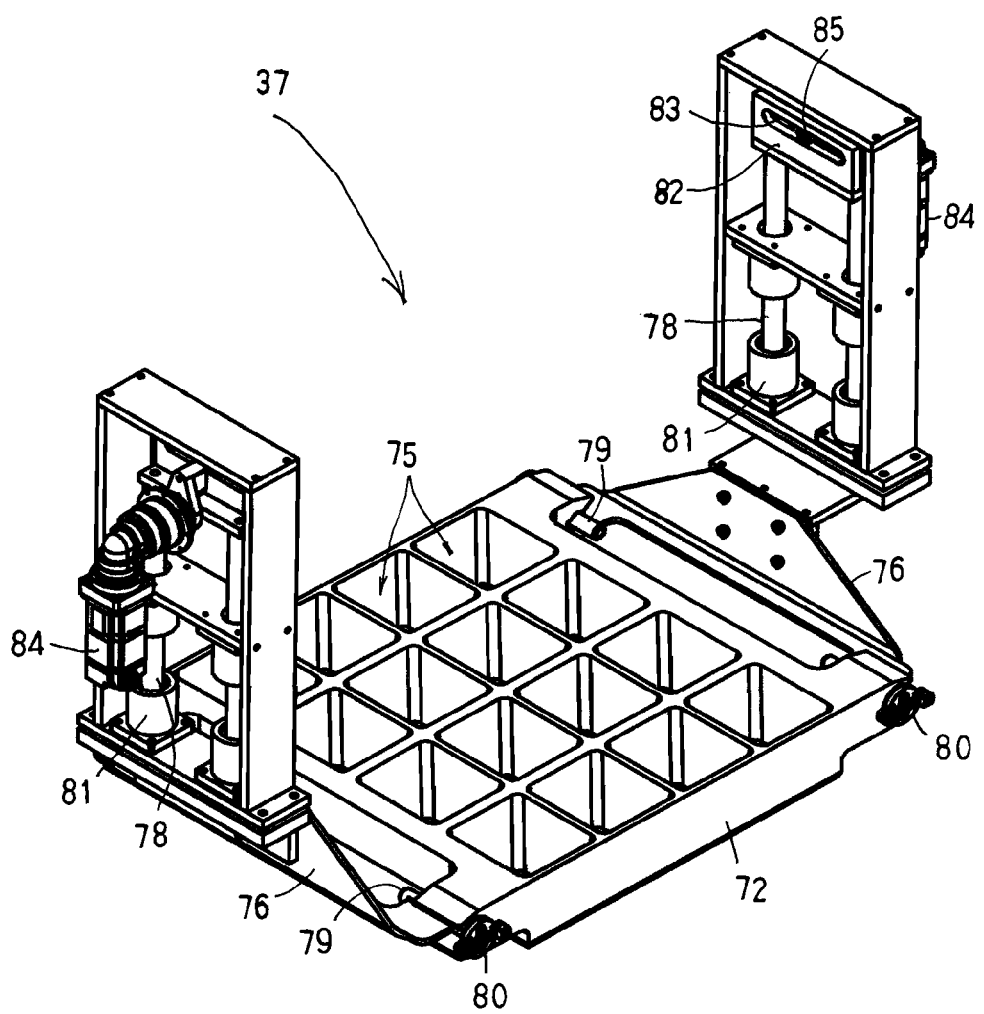
FIG. 15 is a perspective view of a support structure for a diving funnel array of the discharging/guiding mechanism.
Figure 16:
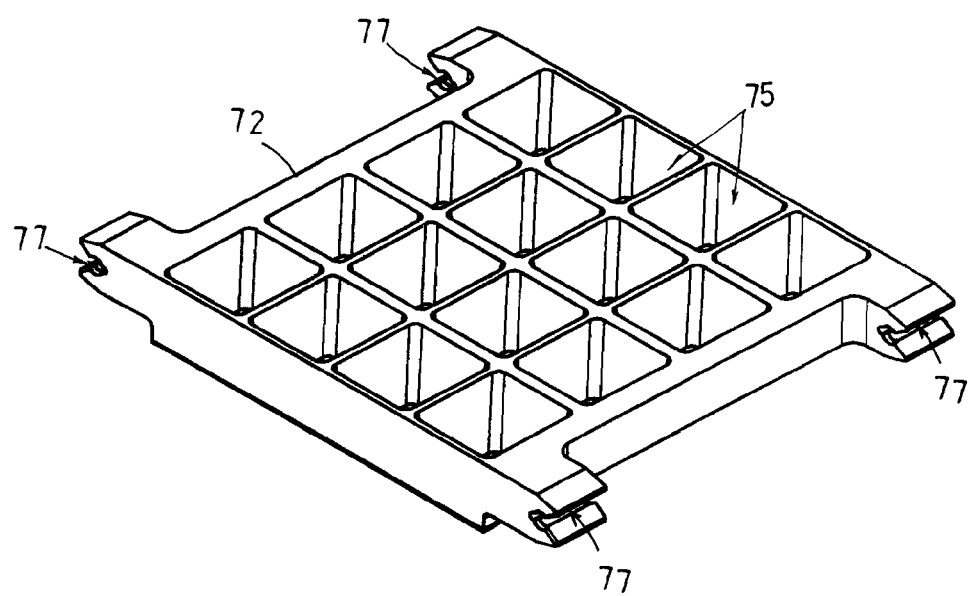
FIG. 16 is a perspective view of the diving funnel array.

As illustrated in FIG. 14, right and left support brackets 73 are coupled and fixed to lower end surfaces of the side support structures 33 and 34, and the fixed position transfer funnel 71 is detachably supported by these support brackets 73. The support brackets 73 each have an engaging recess 73a formed in a width corresponding to the width of the fixed position transfer funnel in the front-back direction. Further, the support brackets 73 each have a pair of engaging claws 73b at two positions in the front-back direction. These engaging claws 73b are engageable with lateral ends of the fixed position transfer funnel 71. By engaging the fixed position transfer funnel 71 with the support brackets 73 using the paired engaging cavities 73a and four engaging claws 73b, the fixed position transfer funnel 71 is fixable in the front-back and lateral directions at a predetermined height.

The fixed position transfer funnel 71 has 16 through holes 74; first through holes, vertically formed and facing the lower end outlets of the holding mechanism 36. These through holes 74 are arranged in four horizontal rows and four vertical rows and each have a cylinder 71a protruding downward. In the fixed position transfer funnel 74 in the illustrated example, four pieces divided in the front-back direction are combined and engaged to be immovable in the lateral direction. Instead, the whole fixed position transfer funnel 71 may be formed as an integral unit.

As illustrated in FIGS. 15 to 18, the diving funnel array 72 also has 16 through holes 75; first through holes, vertically formed. These through holes 75 are likewise arranged in four horizontal rows and four vertical rows, i. e., four columns and four rows, and used as passages for guiding the items.

Figure 20:
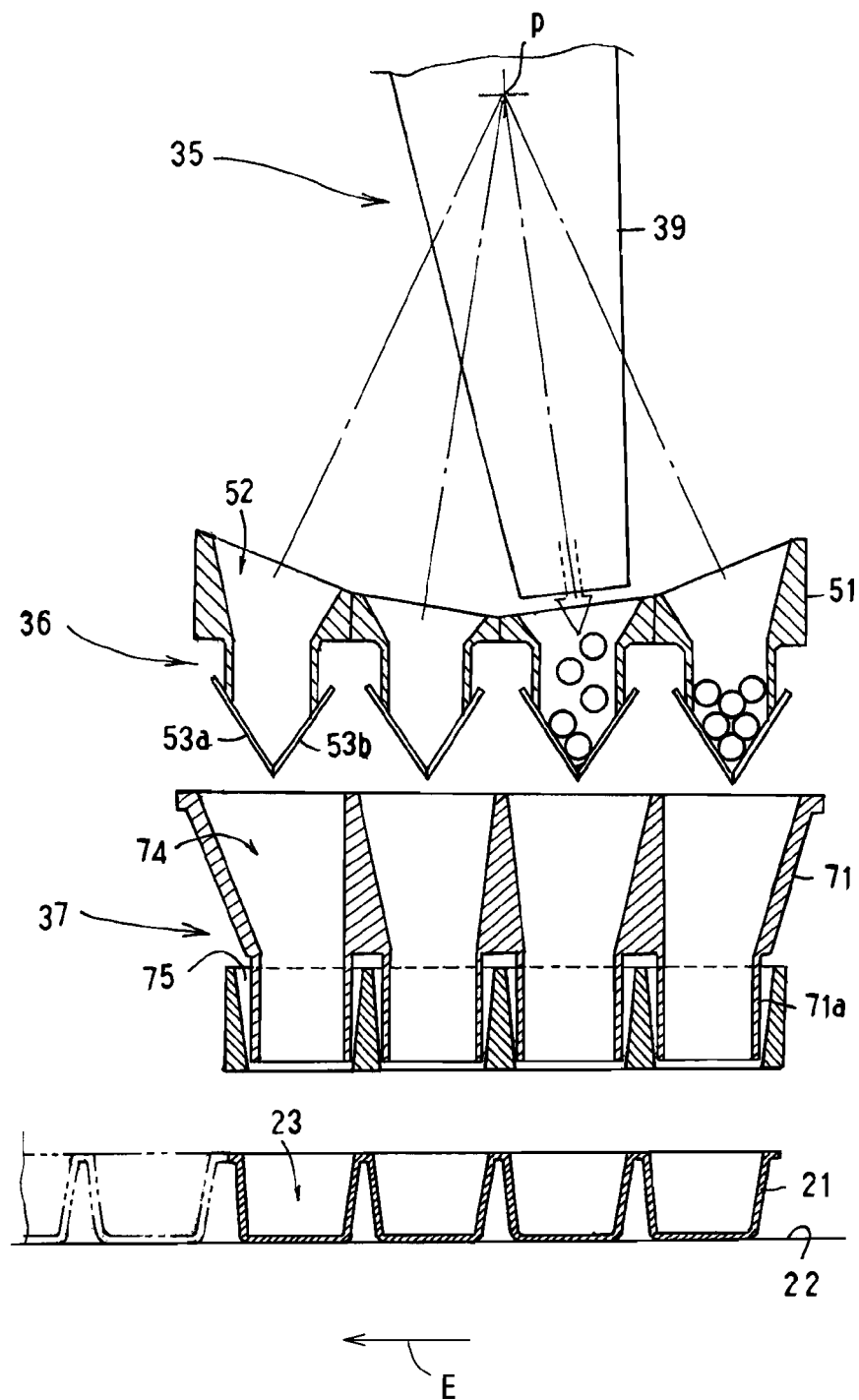
FIG. 20 is a schematic, longitudinal side view of an item holding operation carried out by the depositor apparatus.
Figure 21:
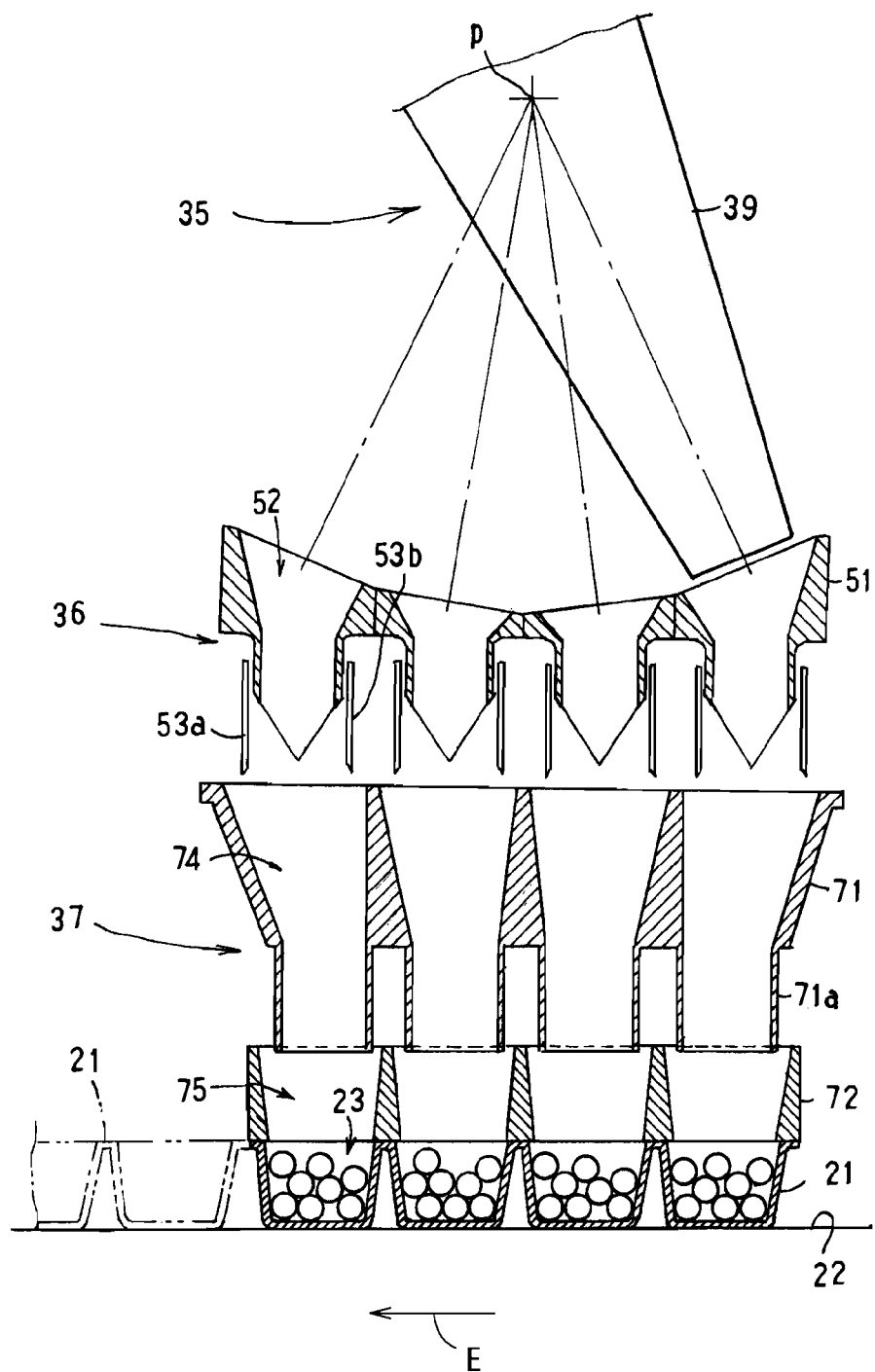
FIG. 21 is a schematic, longitudinal side view of an item filling operation carried out by the depositor apparatus.

The cylinders 71a of the fixed position transfer funnel 71 protrude in a length that allows the cylinders 71a to penetrate in a relatively large depth into the through holes 75 of the diving funnel array 72 when the diving funnel array 72 is moved upward (see FIG. 20) and that allows the cylinders 71a to penetrate in a relatively small depth into the through holes 75 of the diving funnel array 72 when the diving funnel array 72 is moved downward (see FIG. 21). There is accordingly no gap that may invite the items to leak out sideways between the lower ends of the through holes 74 in the fixed position transfer funnel 71 and the upper ends of the through holes 75 in the diving funnel array 72.

The diving funnel array 72 is removably mounted to vertical slide brackets 76 at lower parts of the side support structures 33 and 34 as described below.

Figure 17:
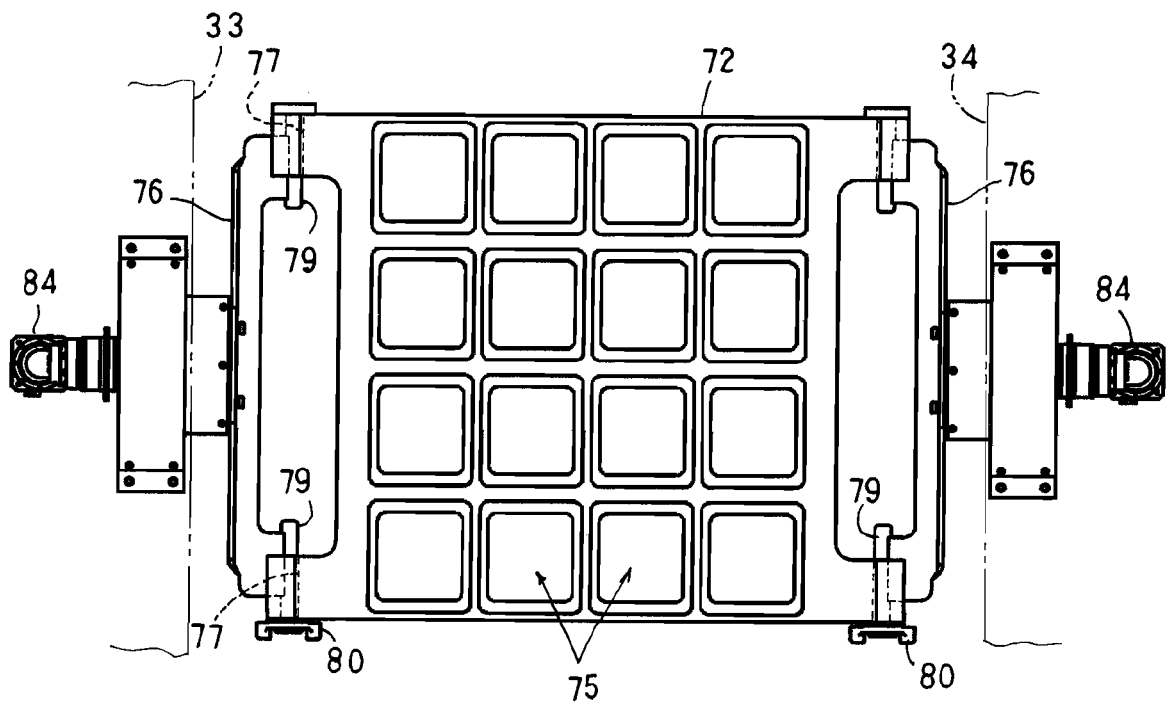
FIG. 17 is a plan view of the support structure for the diving funnel array.
Figure 18:
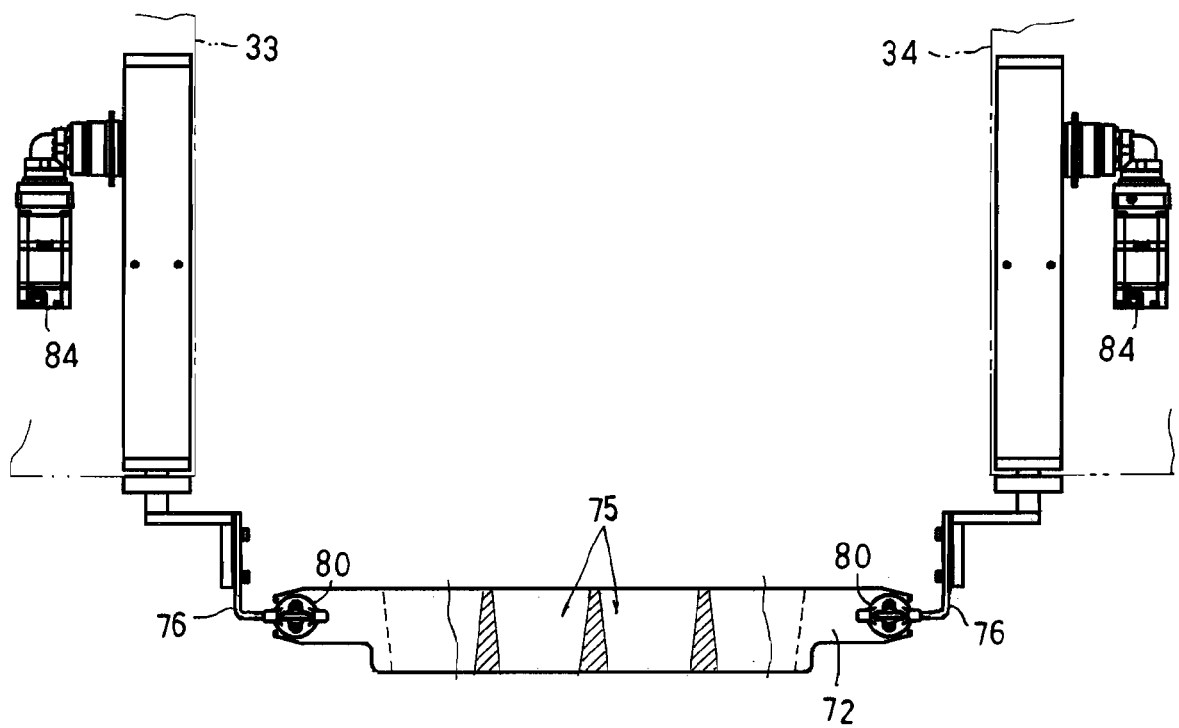
FIG. 18 is a partly cutaway, front view of the support structure for the diving funnel array.
Figure 19A:
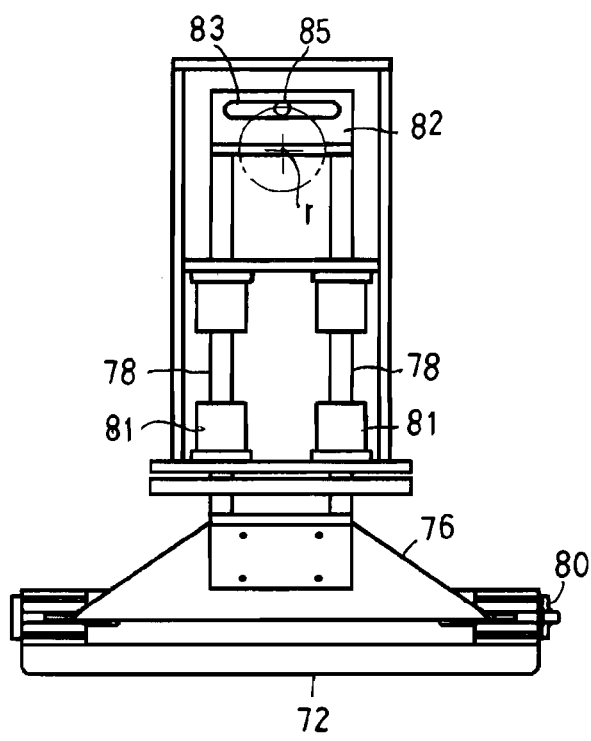
FIG. 19A is a side view of the diving funnel array that has been moved upward.
Figure 19B:
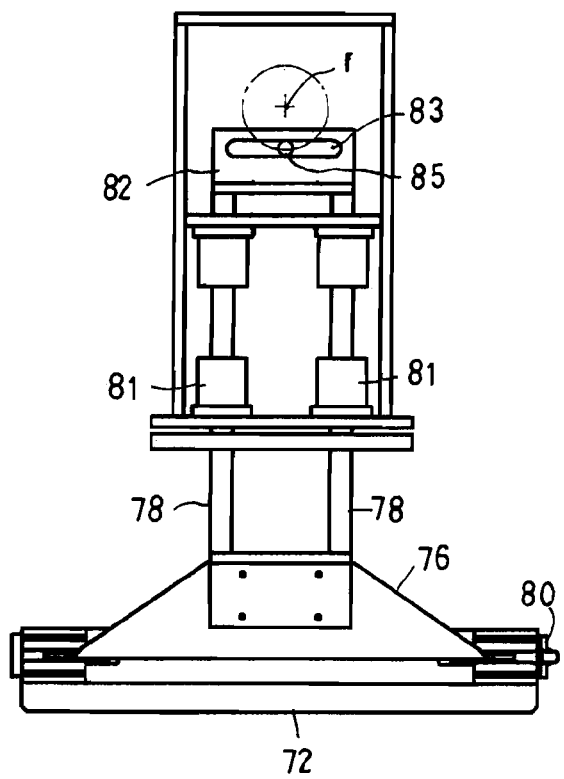
FIG. 19B is a side view of the diving funnel array that has been moved downward.

As illustrated in FIG. 17, the diving funnel array 72 has, at its lateral ends, pairs of front and back coupling grooves 77 that are circular in part. The grooves 77 are horizontally formed in the lateral direction and each have an opening sideways. The vertical slide brackets 76 on the right and left sides are coupled to and supported by the lower ends of pairs of front and back support rods 78 vertically protruding from the lower ends of the side support structures 33 and 34. The support rods 78 are allowed to protrude from and recede to the lower ends of the side support structures 33 and 34. On inner ends of the vertical slide brackets 76 are pairs of front and back coupling shafts 79 that are fittable into and removable from the coupling grooves 77 of the diving funnel array 72 in the longitudinal direction of these grooves. By using the coupling grooves 77 and the coupling shafts 79, the diving funnel array 72 is insertable into and removable from the vertical slide brackets 76 in the front-back direction. After the diving funnel array 72 is fitted to and supported by the vertical slide brackets 76, lock rings 80 are rotated and fitted to front outer ends of the coupling shafts 79 to fix the diving funnel array 72 to the vertical slide brackets 76 not to move in the front-back direction. By removing the lock rings 80, the diving funnel array 72 is allowed to move forward and backward and pulled forward out of the vertical slide brackets 76.

The paired front and back support rods 78, which the vertical slide brackets 76 are coupled to and supported by, are inserted in and supported by bosses 81 fixed in the side support structures 33 and 34 in a manner that are slidable upward and downward. Further, cam blocks 82 are coupled to upper ends of the support rods 78. The cam blocks 82 each have a long cam groove 83 formed in the front-back direction and a drive pin 85 fitted in the cam groove 83. The drive pins 85 are rotated by servo motors in the side support structures 33 and 34 around an axis horizontally extending in the lateral direction. When the drive pins 85b are each eccentrically rotated around an axis r, the support rods 78 coupled to the working plates 82 and the elevating brackets 76 coupled to these support rods are moved upward and downward, and the diving funnel array 72 is correspondingly moved upward and downward.

A distance by which the diving funnel array 72 moves upward and downward is adjustable by manipulating an operation setting display, not illustrated in the drawings, of the depositor apparatus C. The distance may be adjusted, so that the lower surface of the diving funnel array 72 appropriately contacts the upper surface of the container 21 when the diving funnel array 72 is moved downward.

The weighing and feeding system according to this embodiment is structurally and technically characterized as described thus far. The operation of this system is hereinafter described.

The items weighed in four structural units of the combination weigher A are temporarily stored in the four collecting hoppers 8. When all of the collecting hoppers 8 are filled with the items, the collecting gates 9 are opened to drop the items from the collecting hoppers 8 into the collating mechanism 35 of the depositor apparatus C.

In the collating mechanism 35, the items dropping from the four structural units are received by the four collating chutes 39 and guided downward into the holding array 51 of the holding mechanism 36.

As illustrated in FIG. 20, the collating chutes 39 have been pivoted to have their lower end outlets face, for example, a first row of empty holding cells 52 in the holding array 51. The collating chutes 39 sequentially pivot to four positions in the front-back direction to feed the items into four rows, first to fourth rows, of holding cells 52 of the holding array 51 in the front-back direction.

When the four rows of holding cells 52 of the holding array 51 in the front-back direction are all filled with the items, all of the discharge gates 53a and 53b are opened, and the items in all of the 16 holding cells 52 are discharged simultaneously into the discharging/guiding mechanism 37.

In the discharging/guiding mechanism 37, the diving funnel array 72 that has been moved downward is in contact with the upper surface of the container 21 ready to receive the items. First, the items are dropped into the through holes 74 of the fixed position transfer funnel 71 and then guided by the through holes 75 of the diving funnel array 72 into the pockets 23 of the container 21.

As illustrated in FIG. 21, the diving funnel array 72 has been moved downward to make contact with the whole upper surface of the container 21. The lower surface of the diving funnel array 72 thus situated covers upper surfaces of peripheral edges of the pockets 23, and extraneous matter, such as scattering fragments of the items, may be accordingly prevented from falling on and attaching to the upper surfaces of peripheral edges of the pockets 23 and/or from falling into any untargeted pockets 23 in adjacency to originally targeted ones. This may prevent possible sealing failure when a film sheet is attached to the upper surface of the container 21 to independently seal the pockets 23, and may also prevent that the weighed items in any of the pockets 23 have a weight beyond a predetermined range of weights.

After all of its pockets in one container 21 are filled with the items, the diving funnel array 72 is moved upward away from the upper surface of the article-filled container 21. Then, the item-filled container 21 is conveyed by a distance corresponding to four rows in a direction indicated with arrow E, and an empty container is conveyed to a position immediately below the depositor apparatus C to be ready to receive the items. During that time, the items continue to be supplied into the holding array 51 of the holding mechanism 36.

Figure 22:
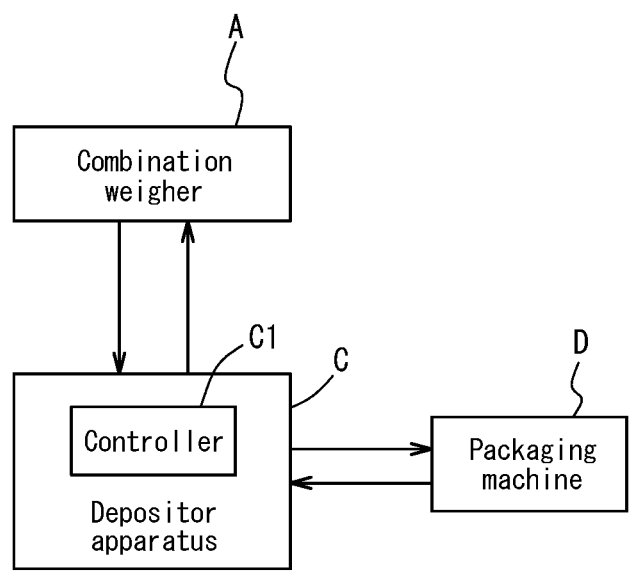
FIG. 22 is a block diagram of a combination weigher, depositor apparatus, and packaging apparatus.

FIG. 22 is a schematic block diagram of the combination weigher A, depositor apparatus C, and packaging machine D, illustrating reception of signals among these apparatuses and their signal-based operations.

In this embodiment, the combination weigher A, the depositor apparatus C, and the packaging machine D that controls the depositor apparatus C operate as described below.

The packaging machine D transmits a request signal corresponding to a 4 column×4 row matrix-like pattern, which is the container's pattern of arrangement, to the depositor apparatus C. Based on the request signal transmitted from the packaging machine D, the controller C1 of the depositor apparatus C transmits a request signal corresponding to, for example, a first row of holding cells 52 in the holding array 51 to the combination weigher A. In response to the request signal transmitted from the depositor apparatus C, the combination weigher A discharges the items into the depositor apparatus C, and then transmits a signal for confirming discharge to the depositor apparatus C.

The items discharged from the combination weigher A are guided by the collating chutes 39 of the depositor apparatus C and dropped into a first row of four holding cells 52 in the holding array 51. The controller C1 of the depositor apparatus C receives the signal for confirming discharge from the combination weigher A. In response to the received signal, the controller C1 swings the collating chutes 39 to a position corresponding to a second row of holding cells 52 in the holding array 51, and then transmits a request signal to the combination weigher A.

In response to the received request signal from the depositor apparatus C, the combination weigher A discharges the items into the depositor apparatus C, and then transmits a signal for confirming discharge to the depositor apparatus C. The items discharged from the combination weigher A are guided by the collating chutes 39 of the depositor apparatus C and dropped into a second row of four holding cells 52 in the holding array 51. The controller C1 of the depositor apparatus C receives the signal for confirming discharge from the combination weigher A. In response to the received signal, the controller C1 swings the collating chutes 39 to a position corresponding to a third row of holding cells 52 in the holding array 51, and then transmits a request signal to the combination weigher A.

Thereafter, the items, in the order of first row→second row→third row→fourth row, will be similarly supplied into and held in all of the 16 holding cells 52 in the holding array 51 of the depositor apparatus C.

Upon completing the supply of items into all of the 16 holding cells 52 of the holding array 51, the controller C1 of the depositor apparatus C transmits a ready signal to the packaging machine D.

In response to the ready signal transmitted from the depositor apparatus C, the packaging machine D transmits a request signal corresponding to the 4×4 matrix-like pattern to the depositor apparatus C. In response to the request signal transmitted from the packaging machine D, the controller C1 of the depositor apparatus C prompts the diving funnel array 72 to move downward into contact with the upper surface of the container 21. Then, the controller C1 opens all of the discharge gates 53a and 53b in the holding array 51 simultaneously to discharge the items into all of the 16 pockets 23 of the 4×4 matrix-like pattern at the same time. After the items are discharged from the depositor apparatus C, the controller C1 transmits a signal for confirming discharge to the packaging machine D.

In response to the received signal for confirming discharge, the packaging machine D prompts the article convey apparatus B to convey the container 21 by a distance corresponding to four rows, i.e., one whole container, using the conveyer 22 running to convey the containers 21, and then transmits a request signal corresponding to the 4×4 matrix-like pattern to the depositor apparatus C.

Based on the request signal transmitted from the packaging machine D, the controller C1 of the depositor apparatus C transmits a request signal corresponding to a fourth row of holding cells 52 in the holding array 51 to the combination weigher A. In response to the request signal transmitted from the depositor apparatus C, the combination weigher A discharges the items into the depositor apparatus C, and then transmits a signal for confirming discharge to the depositor apparatus C.

The items discharged from the combination weigher A are guided by the collating chutes 39 of the depositor apparatus C and dropped into a fourth row of four holding cells 52 in the holding array 51. The controller C1 of the depositor apparatus C receives the signal for confirming discharge from the combination weigher A. In response to the received signal, the controller C1 swings the collating chutes 39 to the position corresponding to the third row of holding cells 52 in the holding array 51, and then transmits a request signal to the combination weigher A.

Based on the request signal transmitted from the depositor apparatus C, the combination weigher A discharge the items into the depositor apparatus C, and then transmits a signal for confirming discharge to the depositor apparatus C. The items discharged from the combination weigher A are guided by the collating chutes 39 of the depositor apparatus C and dropped into the third row of four holding cells 52 in the holding array 51. The controller C1 of the depositor apparatus C receives the signal for confirming discharge from the combination weigher A. In response to the received signal, the controller C1 swings the collating chutes 39 to the position corresponding to the second row of holding cells 52 in the holding array 51, and then transmits a request signal to the combination weigher A.

Thereafter, the items, in the order of fourth row→third row→second row→first row, will be similarly supplied into and held in all of the holding cells 52 in the holding array 51 of the depositor apparatus C.

Upon completing the supply of items into all of the 16 holding cells 52 of the holding array 51, the controller C1 of the depositor apparatus C transmits a ready signal to the packaging machine D.

In response to the ready signal transmitted from the depositor apparatus C, the packaging machine D transmits a request signal corresponding to the 4×4 matrix-like pattern to the depositor apparatus C. In response to the request signal transmitted from the packaging machine D, the controller C1 of the depositor apparatus C prompts the diving funnel array 72 to move downward into contact with the upper surface of the container 21. Then, the controller C1 opens all of the discharge gates 53a and 53b of the holding array 51 simultaneously to discharge the items simultaneously into all of the 16 pockets 23 of the 4×4 matrix-like pattern. After the items are discharged from the depositor apparatus C, the controller C1 transmits a signal for confirming discharge to the packaging machine D.

In response to the signal for confirming discharge, the packaging machine D prompts the article convey apparatus B to convey the container 21 by a distance corresponding to four rows, i.e., one whole container, using the conveyor 22 running to convey the containers 21, and then transmits a request signal corresponding to the 4×4 matrix-like pattern to the depositor apparatus C.

The operation cycle described thus far is thereafter repeatedly carried out; holding the items supplied from the combination weigher A in the holding cells 52 of the holding array 51 in the depositor apparatus C, discharging the items simultaneously from the holding array 51 into the pockets 23 arranged in the 4×4 matrix-like pattern, and moving the container 21 forward by a distance corresponding to four rows.

According to this embodiment, the items supplied from the combination weigher A into the collating chutes 39 of the depositor apparatus C are held in a respective one of the 16 holding cells 52 of the holding array 51, and the discharge gates 53a and 53b are opened after all of the holding cells 52 are filled with the items, so that the items in all of the holding cells 52 are discharged simultaneously into the 4×4 matrix-arranged pockets 23 of the container 21. At the time of discharging the items, the diving funnel array 73 is moved downward to contact and cover the upper surface of the container 21, and extraneous matter, such as scattering fragments of the items, may be accordingly prevented from falling on and attaching to the upper surfaces of peripheral edges of the pockets 23 and/or from falling into any untargeted pockets 23 adjacent to originally targeted ones.

This may prevent possible sealing failure when a film sheet is attached to the upper surface of the container 21 to independently seal the pockets 23.

Further, avoidance of the items being lodged in any untargeted pockets 23 nearby may also prevent that the weighed items in any of the pockets 23 have a weight beyond a predetermined range of weights.

By swinging the collating chutes 39 forward and backward along the arcuate trajectory to distribute the items into the holding cells 52 arranged in the holding array 51, the items may be speedily and smoothly dropped into the holding cells 52, and then efficiently discharged into the plural pockets 23 of the container 21.

Other Embodiments

Another non-limiting embodiment of this disclosure is hereinafter described.

1) The 4×4 matrix-like pattern is a given example of the pattern of arrangement of the pockets 23; storage cavities, in the container 21. The pattern of arrangement may be a matrix-like pattern of one-column and plural rows (or plural columns and one-row), which may be optionally selected from 2×2 to 6×6 patterns of arrangement.

Depending on which one of the various patterns of arrangement is selected for the pockets 23, the number of collecting hoppers 8 that decides the number of discharge paths of the combination weigher A, the number of collating chutes 39, the number and arrangement of holding cells 52 of the holding array 51, and the number and arrangement of through holes 74, 75 of the fixed position transfer funnel 71, diving funnel array 72 may be optionally changed, and an appropriate number of intermediate collating chutes 91 described later may be further combined and used.

Figure 23:
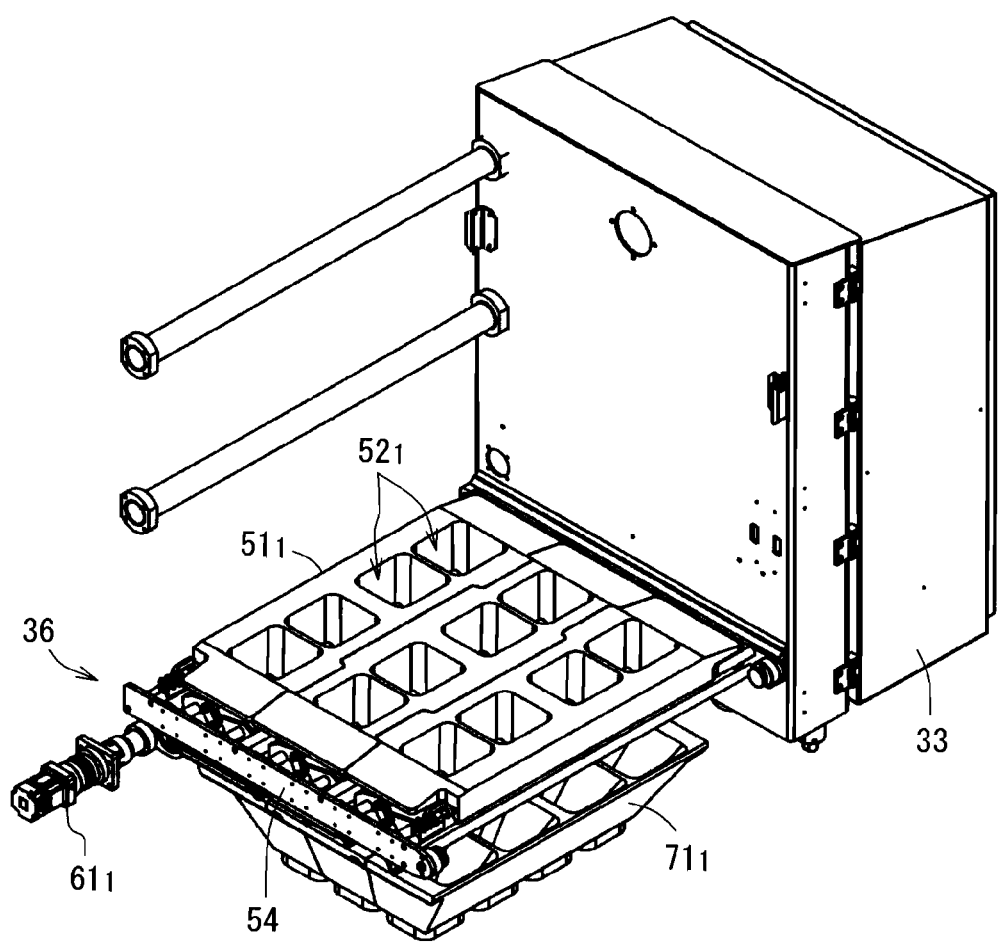
FIG. 23 is a perspective view of another embodiment of the illustration of FIG. 9.

In case the container has pockets arranged in a 4×3 matrix-like pattern, for example, a holding array 511 may have 12 holding cells 521 corresponding to the 4×3 matrix-like pattern, and a fixed position transfer funnel 711, as well as a diving funnel array not illustrated in the drawings, may have 12 through holes corresponding to the 4×3 matrix-like pattern, as in FIG. 23 illustrating a modified example of FIG. 9.

In the embodiment described earlier, the items are discharged simultaneously after all of the holding cells 52 in the holding array 51 are filled with the items. According to another embodiment, the items may be discharged simultaneously after at least part of the holding cells 52 in the holding array 51 are filled with the items.

Different types of items may be combined and weighed in four structural units of the combination weigher A, in which case the pockets 23 of the container 21 each receive a combination of different types of items.

Non-limiting examples of the container may include diverse packaging containers, such as trays, bowls, cups, and thermoforming pouches.

2) In the embodiment described earlier, the depositor apparatus C may be movable to the working position immediately below the combination weigher A and the maintenance position remote from immediately below the combination weigher A. The depositor apparatus C may be fixedly installed at the working position immediately below the combination weigher A.

3) In case the lower end of the diving funnel array 72 is made of a soft resin material such as urethan rubber, the lower end of this funnel may be allowed to elastically contact tightly to the upper surfaces of the pockets' peripheral edges when the diving funnel array 72 is moved downward. This may further effectively prevent extraneous matter from attaching to the upper surface of the container 21.

Figure 24:
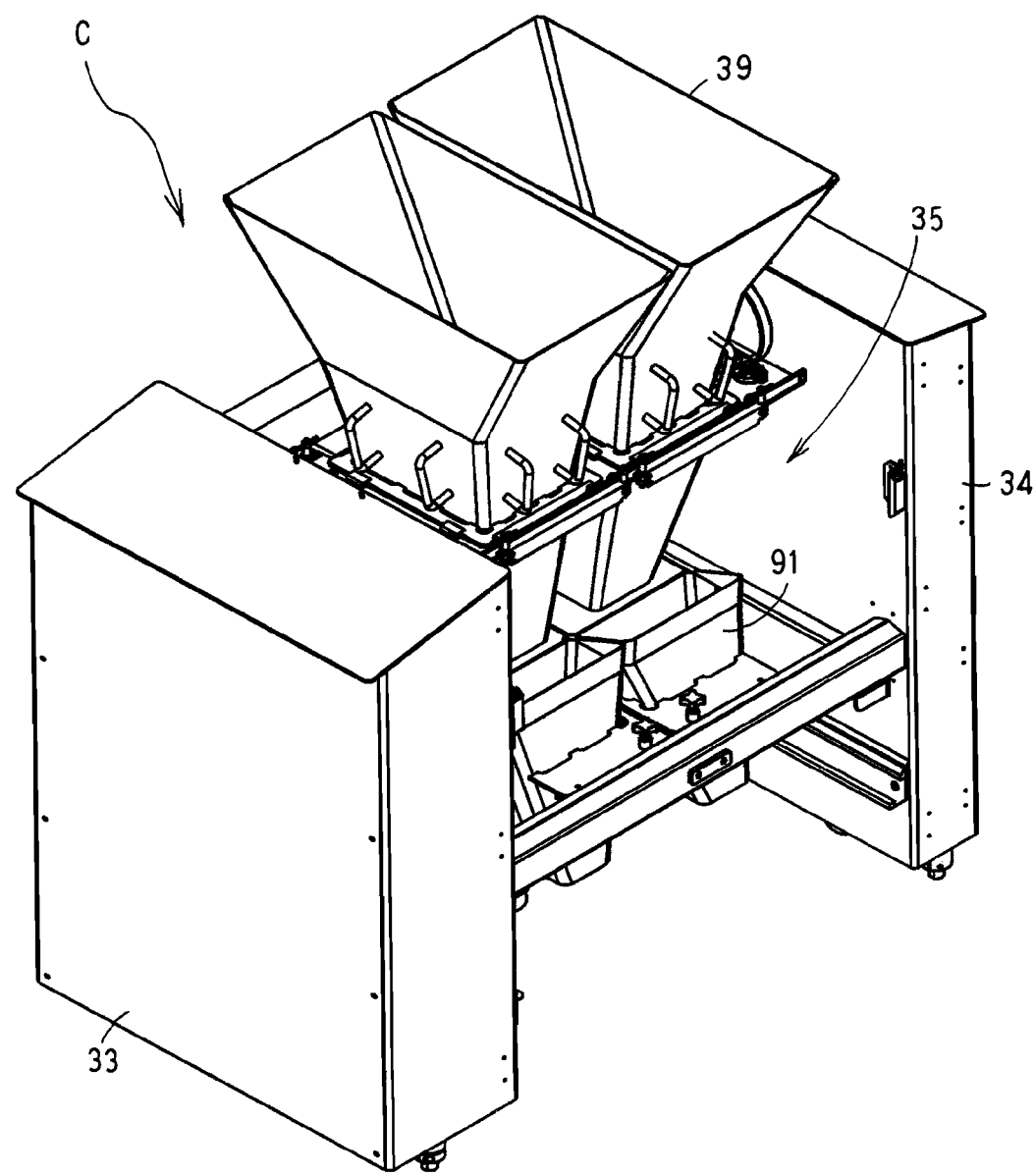
FIG. 24 is a perspective view of another embodiment of the collating mechanism and the holding mechanism.
Figure 25:
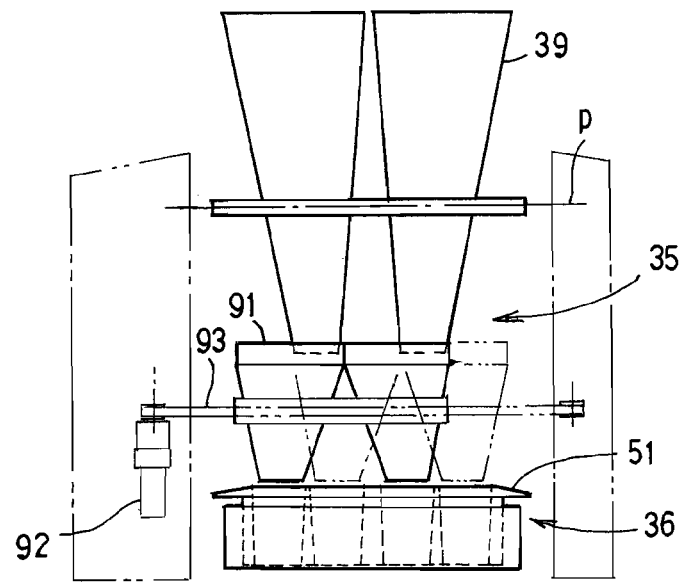
FIG. 25 is a schematic front view of the another embodiment.
Figure 26:
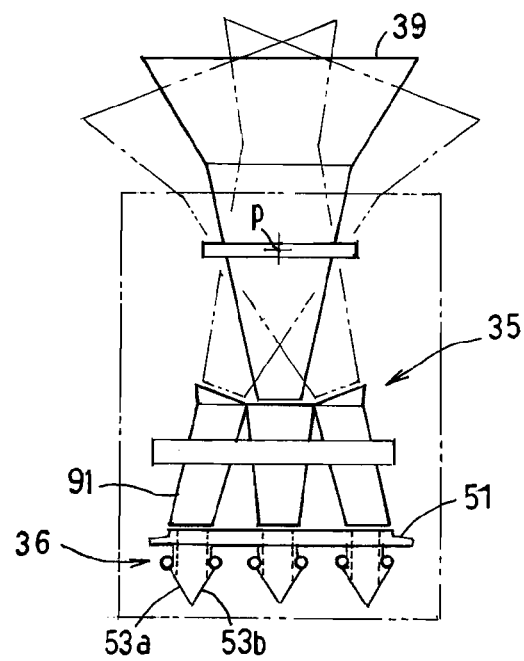
FIG. 26 is a schematic side view of the another embodiment.

4) The collating mechanism 35 may be configured for a combination of swinging motion and linear transverse movement. For example, two pairs of three intermediate collating chutes 91 on right and left sides may be installed below two collating chutes 29 swingable to three positions in the front-back direction to receive the items dropped out of the collating chutes 39 moving to the three positions, as illustrated in FIGS. 24 to 26. These two pairs of intermediate collating chutes 91 may be supported and guided by rails so as to move in the lateral direction and coupled to belts 93 horizontally driven by a servo motor 92. When the intermediate collating chutes 91 are transversely moved to two positions in the lateral direction by driving the belts 93 forward and backward, the items may be distributed into 12 holding cells 52 that are arranged in the holding array 51 of the holding mechanism 36 in three vertical rows in the front-back direction and four horizontal rows in the lateral direction.

INDUSTRIAL APPLICABILITY

This application may be advantageously useful for a depositor apparatus suitable for use in discharging and feeding items weighed by a weighing apparatus.

DESCRIPTION OF REFERENCE SYMBOLS

A combination weigher
B container convey apparatus
C depositor apparatus
21 container
23 pocket (storage cavity)
33 side support structure
34 side support structure
35 collating mechanism
36 holding mechanism
37 discharging/guiding mechanism
38 pivotable frame
39 collating chute
51 holding array
52 holding cell
53a discharge gate
53b discharge gate
71 fixed position transfer funnel
72 diving funnel array
74 through hole
75 through hole

The invention claimed is:

1. A depositor apparatus,
wherein the depositor apparatus is configured to be located at a position above a container having a plurality of storage cavities formed to contain items and having an upper surface contiguous with the plurality of storage cavities, the storage cavities being arranged in a matrix-like pattern, the depositor apparatus being configured to discharge the items into the plurality of storage cavities of the container,
the depositor apparatus comprising:
a collating mechanism;
a holding mechanism; and
a discharging/guiding mechanism,
the collating mechanism comprising a plurality of cylindrical collating chutes each having an upper end opening and a lower end outlet, the plurality of collating chutes each being configured to receive the items supplied from above, guide the items downward, and discharge the items from the lower end outlet by swinging forward and backward in any one of a column direction and a row direction of the matrix-like pattern,
the holding mechanism comprising a holding array having a plurality of vertically extending holding cells arranged in correspondence to the matrix-like pattern and a plurality of discharge gates each configured to open and close a lower port of a respective one of the plurality of holding cells of the holding array, the holding mechanism being configured to hold the items supplied from the lower end outlet of the collating chute in the plurality of holding cells of the holding array in which the plurality of discharge gates are closed,
the discharging/guiding mechanism comprising a diving funnel array and a fixed position transfer funnel,
the diving funnel array being configured to reciprocate downward and upward between an upper position at which the diving funnel array is spaced apart from an upper surface of the container and a lower position at which the diving funnel array contacts the entire upper surface of the container, the diving funnel array including a plurality of first through holes that are vertically formed, each of the plurality of first through holes being a passage individually guiding the items discharged from the lower port of each of the plurality of holding cells into each of the plurality of storage cavities of the container,
the fixed position transfer funnel including a plurality of second through holes that are vertically formed at a position below, and corresponding to, the lower port of each of the plurality of holding cells of the holding mechanism, the fixed position transfer funnel comprising a plurality of cylinders each extending downwardly in correspondence to each of the plurality of first through holes,
the plurality of cylinders each being configured to be inserted in a relatively large depth into each of the plurality of first through holes of the diving funnel array when the diving funnel array is moved upward to an upper position and in a relatively small depth into each of the plurality of first through holes of the diving funnel array when the diving funnel array is moved downward to a lower position,
the storage mechanism being configured to open the plurality of discharge gates of the holding array, discharge the items stored in each of the plurality of holding cells from the lower port of each of the plurality of holding cells, and drop the items into each of the plurality of second through holes of the fixed position transfer funnel when the items are stored in each of the plurality of holding cells at each swing position of the plurality of collating chutes,
the diving funnel array being configured to contact and thereby cover the upper surface of the container, including upper surfaces of peripheral edges of the plurality of storage cavities, and guide the items from the plurality of the first through holes of the diving funnel array into the plurality of storage cavities of the container, when the diving funnel array is at the lower end position.

2. The depositor apparatus according to claim 1, wherein the depositor apparatus is configured so that when the diving funnel array of the discharging/guiding mechanism is at the lower position after the plurality of holding cells of the holding array are supplied with the items, the holding mechanism opens the discharge gates to discharge the items simultaneously from the plurality of holding cells of the holding array.

3. The depositor apparatus according to claim 2, wherein the matrix-like pattern of arrangement has m-columns and n-rows (where m and n are natural numbers greater than or equal to 2) and the depositor apparatus is configured to deposit the items in each of a plurality of the containers which are conveyed one after another by a distance corresponding to the m-columns or n-rows, the collating mechanism comprises m number of or n number of the collating chutes,
the collating mechanism swings the m number of or the n number of the collating chutes to m number of or n number of positions along the arcuate trajectory to sort the items into the plurality of holding cells,
the plurality of holding cells in the holding array of the holding mechanism are m×n number of holding cells,
the discharging-guiding mechanism is configured so that when the diving funnel array of the discharging/guiding mechanism is at the lower position after all of the plurality of holding cells in the holding array are filled with the items, the holding mechanism opens the discharge gates to discharge the items from all of the holding cells of the holding array simultaneously, and so that the diving funnel array of the discharging/guiding mechanism at the lower position guides the items discharged from all of the holding cells of the holding array into the plurality of storage cavities arranged in the matrix-like pattern with the m-columns and n-rows.

4. An apparatus comprising the depositor apparatus according to claim 3 and a combination weigher, wherein the combination weigher is positioned above the depositor apparatus, the combination weigher comprising m number of or n number of collecting hoppers from which the items weighed are discharged, and
the collecting hoppers are configured so that the items weighed and discharged from the m number of the collecting hoppers or the n number of the collecting hoppers are dropped into the m number of the collating chutes or the n number of the collating chutes of the collating mechanism.

5. The depositor apparatus according to claim 1, wherein the holding array of the holding mechanism has an upper end surface shaped along the arcuate trajectory of the lower end outlets of the plurality of the collating chutes.

6. The depositor apparatus according to claim 2, wherein the collating mechanism comprises a pivotable frame supported in a manner that is pivotable forward and backward by side support structures on both sides of the depositor apparatus, and
the plurality of the collating chutes are removably mounted to the pivotable frame.

7. The depositor apparatus according to claim 1, wherein the fixed position transfer funnel is detachably supported by support brackets fixed to side support structures on both sides of the depositor apparatus.

8. The depositor apparatus according to claim 1, wherein the discharging/guiding mechanism comprises vertical slide brackets allowed to move upward and downward, the vertical slide brackets being positioned in lower parts of side support structures on both sides of the depositor apparatus, and
the diving funnel array is removably mounted to the vertical slide brackets.

9. The depositor apparatus according to claim 2, wherein the holding mechanism includes support frames that support the holding array and the discharge gates, and
the support frames are movable along guide rails positioned in side support structures on both sides of the depositor apparatus.

10. The depositor apparatus according to claim 1, wherein the lower end of each of the diving funnels of the diving funnel array is made of a soft resin material and is configured to elastically contact tightly to the upper surfaces of the peripheral edges of the storage cavities when the diving funnel array is at the lower position.

11. An apparatus comprising the depositor apparatus according to claim 1 and a packaging machine, wherein the packaging machine is configured to bond a film sheet to the upper surface of the container so that the storage cavities are each independently sealed.

12. The depositor apparatus according to claim 1, wherein the depositor apparatus is configured to cooperate with a conveyor, the conveyor conveying the container which is empty to a position in which the depositor apparatus is located at the position above the empty container for discharging the items into the plurality of storage cavities of the container and the conveyor then conveying the filled container away from the depositor apparatus, the depositor apparatus being configured so that when the depositor apparatus is above the empty container the diving funnel array is in the lower position and when the filled container is being conveyed away from the depositor apparatus the diving funnel array is in the upper position.

* * * * *